(12) United States Patent
Carver et al.

(10) Patent No.: US 10,199,165 B2
(45) Date of Patent: Feb. 5, 2019

(54) ENERGY STORAGE DEVICE

(71) Applicant: Carver Scientific, Inc., Baton Rouge, LA (US)

(72) Inventors: David Reginald Carver, Baton Rouge, LA (US); Robert Glenn Carver, Austin, TX (US); Bradford Wesley Fulfer, Baton Rouge, LA (US); Jaime Hayes Gibbs, Baton Rouge, LA (US); Sean Claudius Hall, Baton Rouge, LA (US); Aaron Trent Priddy, St. Francisville, LA (US); Sean William Reynolds, Baton Rouge, LA (US)

(73) Assignee: Carver Scientific, Inc., Baton Rouge, LA (US)

( * ) Notice: Subject to any disclaimer, the term of this patent is extended or adjusted under 35 U.S.C. 154(b) by 759 days.

(21) Appl. No.: 14/574,175

(22) Filed: Dec. 17, 2014

(65) Prior Publication Data
US 2015/0131198 A1    May 14, 2015

Related U.S. Application Data

(63) Continuation-in-part of application No. 14/499,028, filed on Sep. 26, 2014, and a continuation-in-part of
(Continued)

(51) Int. Cl.
*H01G 4/018* (2006.01)
*H01G 13/00* (2013.01)
(Continued)

(52) U.S. Cl.
CPC ............... *H01G 4/018* (2013.01); *H01G 4/14* (2013.01); *C08F 232/06* (2013.01); *Y10T 156/1052* (2015.01)

(58) Field of Classification Search
CPC ............ H01G 4/018; H01G 4/14; H01G 4/04; H01G 4/206; H01G 13/00
(Continued)

(56) References Cited

U.S. PATENT DOCUMENTS

| 2,778,762 A | 1/1957 | Eisler |
| 2,789,990 A | 4/1957 | Bullock |

(Continued)

FOREIGN PATENT DOCUMENTS

| CA | 2 908 178 A1 | 10/2014 |
| CN | 103578747 A | 2/2014 |

(Continued)

OTHER PUBLICATIONS

Extended European Search Report issued for European Application No. 14774940.2 (dated Feb. 24, 2017).
(Continued)

*Primary Examiner* — Michael N Orlando
*Assistant Examiner* — Elizabeth Bradford
(74) *Attorney, Agent, or Firm* — Klarquist Sparkman, LLP

(57) ABSTRACT

Embodiments of a high-permittivity, low-leakage energy storage device, such as a capacitor, and methods of making the energy storage device are disclosed. The disclosed device includes electrically conductive first and second electrodes, and a sterically constrained dielectric film disposed between the first and second electrodes. The sterically constrained dielectric film comprises a plurality of polymeric molecules, and at least some of the polymeric molecules are bound to the first electrode. The disclosed device may include an insulative layer between the first electrode and the dielectric film and/or between the second electrode and the dielectric film.

20 Claims, 6 Drawing Sheets

Related U.S. Application Data application No. 14/156,457, filed on Jan. 16, 2014, now Pat. No. 8,940,850, application No. 14/574,175, which is a continuation-in-part of application No. 14/490,873, filed on Sep. 19, 2014, now Pat. No. 9,214,280, which is a continuation-in-part of application No. 13/853,712, filed on Mar. 29, 2013, now Pat. No. 9,011,627, which is a continuation-in-part of application No. 13/671,546, filed on Nov. 7, 2012, now abandoned, and a continuation-in-part of application No. 13/599,996, filed on Aug. 30, 2012, now Pat. No. 8,633,289.

(60) Provisional application No. 61/808,733, filed on Apr. 5, 2013.

(51) Int. Cl.
  *H01G 4/14* (2006.01)
  *C08F 232/06* (2006.01)

(58) Field of Classification Search
  USPC ........................................................ 156/275.5
  See application file for complete search history.

(56) References Cited

U.S. PATENT DOCUMENTS

| | | |
|---|---|---|
| 2,798,990 A | 7/1957 | Davis |
| 3,342,754 A | 9/1967 | Gorham |
| 3,397,085 A | 8/1968 | Cariou et al. |
| 3,535,602 A | 10/1970 | Hrach et al. |
| 3,616,314 A | 10/1971 | Settineri et al. |
| 3,907,748 A | 9/1975 | Marvel et al. |
| 4,333,418 A | 6/1982 | Nagel et al. |
| 4,359,327 A | 11/1982 | Armand et al. |
| 4,500,562 A | 2/1985 | Jahn et al. |
| 4,532,369 A | 7/1985 | Harner |
| 4,638,407 A | 1/1987 | Lundsgaard |
| 4,675,462 A | 6/1987 | Ungarelli et al. |
| 4,734,533 A | 3/1988 | Ungarelli et al. |
| 4,748,542 A | 5/1988 | Lundsgaard |
| 4,769,505 A | 9/1988 | Lee et al. |
| 4,795,838 A | 1/1989 | Bornengo et al. |
| 4,806,702 A | 2/1989 | Lee et al. |
| 4,816,608 A | 3/1989 | Bornengo et al. |
| 4,849,559 A | 7/1989 | Lee et al. |
| 4,853,488 A | 8/1989 | Ungarelli et al. |
| 4,886,923 A | 12/1989 | Ungarelli et al. |
| 4,942,061 A | 7/1990 | Domes |
| 4,963,429 A | 10/1990 | Norian et al. |
| 5,079,674 A | 1/1992 | Malaspina |
| 5,110,903 A | 5/1992 | Lee et al. |
| 5,144,529 A | 9/1992 | Takahashi |
| 5,266,291 A | 11/1993 | Drnevich et al. |
| 5,305,178 A | 4/1994 | Binder et al. |
| 5,636,100 A | 6/1997 | Zheng et al. |
| 5,783,933 A | 7/1998 | Bailly |
| 5,790,368 A | 8/1998 | Naito |
| 6,096,234 A | 8/2000 | Nakanishi et al. |
| 6,307,735 B1 | 10/2001 | Saito et al. |
| 6,341,056 B1* | 1/2002 | Allman ............... H01G 4/20 257/295 |
| 6,602,741 B1 | 8/2003 | Kudoh et al. |
| 6,674,635 B1 | 1/2004 | Fife et al. |
| 7,033,406 B2 | 4/2006 | Weir et al. |
| 7,164,197 B2 | 1/2007 | Mao et al. |
| 7,170,260 B2 | 1/2007 | Thrap |
| 7,190,016 B2 | 3/2007 | Cahalen et al. |
| 7,279,777 B2 | 10/2007 | Bai et al. |
| 7,342,755 B1 | 3/2008 | Horvat et al. |
| 7,429,317 B2 | 9/2008 | Paul, II |
| 7,495,887 B2 | 2/2009 | Cox |
| 7,542,265 B2 | 6/2009 | Tan et al. |
| 7,781,358 B2 | 8/2010 | Hackenberger et al. |
| 8,289,676 B2 | 10/2012 | Giannantonio et al. |
| 8,382,042 B2 | 2/2013 | Sanderson et al. |
| 8,432,663 B2 | 4/2013 | Carver |
| 8,633,289 B2 | 1/2014 | Carver et al. |
| 8,940,850 B2 | 1/2015 | Carver et al. |
| 9,087,645 B2 | 7/2015 | Holme et al. |
| 2004/0210289 A1 | 10/2004 | Wang et al. |
| 2005/0186437 A1 | 8/2005 | Pramanik |
| 2006/0034035 A1 | 2/2006 | Maruo et al. |
| 2006/0065045 A1 | 3/2006 | Borwick, III et al. |
| 2006/0074164 A1 | 4/2006 | Slenes et al. |
| 2006/0191443 A1 | 8/2006 | Yamaguchi et al. |
| 2007/0108490 A1 | 5/2007 | Tan et al. |
| 2007/0117886 A1 | 5/2007 | Tan et al. |
| 2007/0232017 A1 | 10/2007 | Baniecki et al. |
| 2008/0171230 A1 | 7/2008 | Zou et al. |
| 2008/0180876 A1 | 7/2008 | Shimanouchi et al. |
| 2008/0316678 A1* | 12/2008 | Ehrenberg ............ H01G 9/058 361/503 |
| 2009/0090999 A1 | 4/2009 | Carver |
| 2009/0312474 A1 | 12/2009 | Tan et al. |
| 2010/0002362 A1 | 1/2010 | Clelland et al. |
| 2010/0033899 A1 | 2/2010 | Koh et al. |
| 2012/0127122 A1 | 5/2012 | Lim |
| 2012/0241085 A1 | 9/2012 | Carver |
| 2013/0224397 A1 | 8/2013 | Carver |
| 2013/0229157 A1 | 9/2013 | Carver |
| 2014/0295101 A1 | 10/2014 | Carver |
| 2015/0000090 A1 | 1/2015 | Carver et al. |
| 2015/0000833 A1 | 1/2015 | Carver et al. |
| 2015/0017342 A1 | 1/2015 | Carver et al. |
| 2015/0131205 A1 | 5/2015 | Amaratunga et al. |

FOREIGN PATENT DOCUMENTS

| | | |
|---|---|---|
| JP | H07190098 A | 7/1995 |
| JP | H0987647 A | 9/1995 |
| WO | WO 2005/083726 A1 | 9/2005 |
| WO | WO 2009/046341 A1 | 4/2009 |
| WO | WO 2014/035456 A2 | 3/2014 |
| WO | WO 2014/074122 A2 | 5/2014 |
| WO | WO 2014/161007 A2 | 10/2014 |

OTHER PUBLICATIONS

Wang et al., "On the energy conversion and efficiency of a dielectric electroactive polymer generator," *Applied Physics Letters*, Jul. 16, 2012, 101(3):33904.

International Search Report and Written Opinion, dated Dec. 20, 2016, issued in corresponding International Application No. PCT/US2015/065677.

Office Action dated Feb. 1, 2018, in Chinese Patent Application No. 201480031241.0, 13 pp.

Office Action dated Feb. 27, 2018, in Japanese Patent Application No. 2016-505622, 8 pp.

Definition for dielectric materials: http://whatis.techtarget.com/definition/dielectric-material (downloaded Jul. 28, 2014).

Office Action from the U.S. Patent and Trademark Office for U.S. Appl. No. 14/156,457 (dated Aug. 1, 2014).

Office Action from the U.S. Patent and Trademark Office for U.S. Appl. No. 13/853,712 (dated Sep. 17, 2014).

Office Action from the U.S. Patent and Trademark Office for U.S. Appl. No. 14/490,873 (dated Jan. 15, 2015).

Final Office Action from the U.S. Patent and Trademark Office for U.S. Appl. No. 14/490,873 (dated Jun. 4, 2015).

International Preliminary Report on Patentability and Written Opinion for PCT/US2014/033102 (dated Oct. 8, 2015).

Office Action, dated Sep. 4, 2018, issued in corresponding China Patent Application No. 2015/80069062.0., with English-language translation.

* cited by examiner

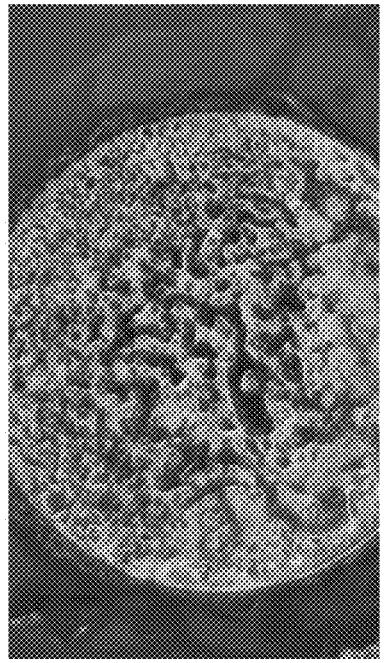
FIG. 7
FIG. 9
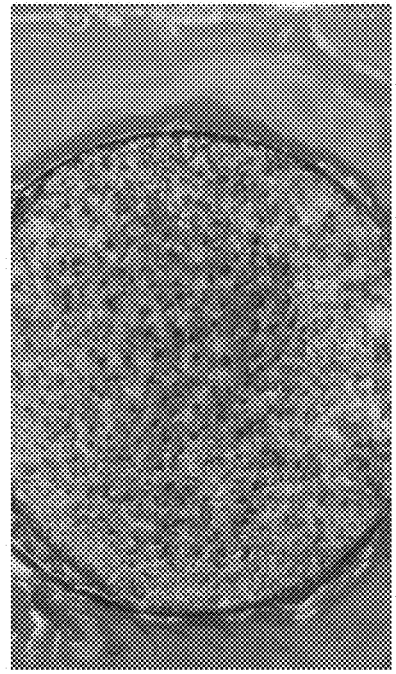
FIG. 8
FIG. 10

ENERGY STORAGE DEVICE

CROSS REFERENCE TO RELATED APPLICATIONS

This application is a continuation-in-part of U.S. application Ser. No. 14/499,028, filed Sep. 26, 2014, which is incorporated herein in its entirety by reference. This application also is a continuation-in-part of U.S. application Ser. No. 14/156,457, filed Jan. 16, 2014, which claims the benefit of U.S. Provisional Application No. 61/808,733, filed Apr. 5, 2013, each of which is incorporated herein in its entirety by reference. This application also is a continuation-in-part of U.S. application Ser. No. 14/490,873, filed Sep. 19, 2014, which is a continuation-in-part of U.S. application Ser. No. 13/853,712, filed Mar. 29, 2013, which is a continuation-in-part of U.S. application Ser. No. 13/671,546, filed Nov. 7, 2012, now abandoned, and a continuation-in-part of U.S. application Ser. No. 13/599,996, filed Aug. 30, 2012, issued as U.S. Pat. No. 8,633,289 on Jan. 21, 2014, each of which is incorporated herein in its entirety by reference.

FIELD

This disclosure concerns embodiments of a high-permittivity, low-leakage energy storage device, such as a capacitor, and methods of making the energy storage device.

BACKGROUND

Electrostatic capacitance is a method of energy storage that has not been widely used for bulk electrical energy storage. In general the charge and discharge mechanisms for traditional electrostatic energy storage in a dielectric material are in a time-domain range of picoseconds to hundreds of microseconds. There is a need for more dense energy storage in both energy densities per unit mass and energy density per unit volume.

SUMMARY

This disclosure concerns embodiments of a high-permittivity, low-leakage energy storage device, such as a capacitor, and methods of making the energy storage device. Embodiments of the energy storage device include an electrically conductive first electrode, an electrically conductive second electrode, and a sterically constrained dielectric film disposed between the electrically conductive first electrode and the electrically conductive second electrodes, the sterically constrained dielectric film comprising a plurality of polymeric molecules. The energy storage device has an energy storage capacity, in the absence of the energy storage device having been charged and/or discharged, of at least 1 Wh/kg based solely on the weight of the sterically constrained dielectric film disposed between the electrically conductive first and second electrodes. In some embodiments, an insulative layer is disposed on the electrically conductive first electrode, the electrically conductive second electrode, or both the electrically conductive first and second electrodes. In any or all of the above embodiments, the polymeric molecules may have one or more polar functional groups, ionizable functional groups, or a combination thereof. In any or all of the above embodiments, at least 1% of the polymeric molecules may be bound to the first electrode or to the insulative layer disposed on the first electrode. In any or all of the above embodiments, the polymeric molecules may be protein molecules. In any or all of the above embodiments, polymeric molecules may be bound to at least 1% of a surface of the electrically conductive first electrode in contact with the dielectric film.

In some embodiments, a method includes making an energy storage device by (a) applying a dielectric film to an electrically conductive first electrode, the dielectric film comprising a film material that (i) is electrically insulative and/or exhibits a high permittivity and (ii) comprises a plurality of polymeric molecules, (b) contacting the dielectric film with an electrically conductive second electrode, and (c) applying an electric field across the first electrode, the dielectric film, and the second electrode, thereby making the energy storage device. In certain embodiments, the method further includes applying an insulative layer to the electrically conductive first electrode to form a composite first electrode, and applying the dielectric film to the insulative layer of the composite first electrode. In any or all of the above embodiments, the electric field may be greater than 100 V/cm. In any or all of the above embodiments, the polymeric molecules may be protein molecules.

In some embodiments, a method includes making an energy storage device by (a) applying a dielectric film to an electrically conductive first electrode, the dielectric film comprising a film material that (i) is electrically insulative and/or exhibits a high permittivity and (ii) comprises a plurality of polymeric molecules having one or more polar functional groups, ionizable functional groups, or a combination thereof; (b) contacting the dielectric film with an electrically conductive second electrode; and (c) binding at least some of the polymeric molecules to the electrically conductive first electrode to form a sterically constrained dielectric film, thereby making the energy storage device. Binding at least some of the polymeric molecules to the electrically conductive first electrode comprises (i) applying an electric field across the first electrode, the dielectric film, and the second electrode such that the first electrode is a positive electrode, the electric field being applied for an effective period of time to bind at least some of the polymeric molecules to the first electrode, (ii) treating the dielectric film with a chemical agent, or (iii) a combination thereof.

In any or all of the above embodiments, the electric field may be at least 0.001 V/μm based on an average thickness of the dielectric film. In some embodiments, the electric field is 0.005-1 V/μm and the effective period of time is from 1 second to 30 minutes.

In any or all of the above embodiments, the method may further include applying an insulative layer to the electrically conductive first electrode to form a composite first electrode, and applying the dielectric film to the insulative layer of the composite first electrode. In one embodiment, binding at least some of the polymeric molecules comprises applying the electric field across the composite first electrode, the dielectric film, and the second electrode for the effective period of time, whereby at least some of the polymeric molecules bind to the insulative layer of the composite first electrode. In an independent embodiment, treating the dielectric film with a chemical agent comprises applying a radical initiator to the insulative layer before applying the dielectric film to the insulative layer, and activating the radical initiator after applying the dielectric film to the insulative layer, thereby binding at least some of the polymeric molecules to the insulative layer of the composite first electrode. In an independent embodiment, treating the dielectric film with a chemical agent comprises (i) derivatizing the polymeric molecules with a derivatization agent to provide functional groups capable of crosslinking to the insulative layer of the composite first electrode, (ii) including a crosslinking agent in the film material of the dielectric film, (iii) including a radical initiator in the film material of the dielectric film, and activating the radical initiator after applying the dielectric film to the insulative layer, (iv) applying a radical initiator to the insulative layer before applying the dielectric film to the insulative layer, and activating the radical initiator after applying the dielectric film to the insulative layer, (v) applying a plasma to the insulative layer before applying the dielectric film to the insulative layer, or (vi) any combination thereof. In any or all of the above embodiments, the insulative layer may comprise polymerized p-xylylene.

In any or all of the above embodiments, the polymeric molecules may comprise proteins, parylene, acrylic acid polymers, methacrylic acid polymers, polyethylene glycol, urethane polymers, epoxy polymers, silicone polymers, terpenoid polymers, naturally occurring resin polymers, polyisocyanates, or combinations thereof. In any or all of the above embodiments, the polymeric molecules may comprise proteins or derivatized proteins.

In any or all of the above embodiments, the electrically conductive second electrode may be a composite second electrode comprising an insulative layer, and the composite second electrode is positioned such that the insulative layer contacts the dielectric film. In any or all of the above embodiments, applying the dielectric film to the electrically conductive first electrode may comprise forming the dielectric film on a removable carrier film, removing the removable carrier film, and applying the dielectric film to the electrically conductive first electrode.

In any or all of the above embodiments, the polymeric molecules may be formed in situ. In such embodiments, the method further includes applying a composition comprising a crosslinking agent and a plurality of polymeric molecule precursors comprising one or more polar functional groups, ionizable functional groups, or a combination thereof to the first electrode, and activating the crosslinking agent, thereby crosslinking the polymeric molecule precursors to provide a dielectric film comprising a plurality of polymeric molecules. In some embodiments, the polymeric molecule precursors comprise (i) amino acid molecules, (ii) oligopeptides, (iii) polypeptides, or (iv) a combination thereof. In some embodiments, the polymeric molecule precursors further comprise p-xylylene monomers.

In an independent embodiment, a method for making an energy storage device includes (a) providing a first sheet or roll of polymer having a metalized surface and comprising an insulative layer on the metalized surface, wherein the insulative layer does not fully cover the metalized surface such that an edge portion of the metalized surface is uncovered; (b) applying a dielectric film to the insulative layer, the dielectric film comprising a film material that (i) is electrically insulative and/or exhibits a high permittivity and (ii) comprises a plurality of polymeric molecules having one or more polar functional groups, ionizable functional groups, or a combination thereof; (c) bringing a second sheet or roll of metalized polymer into contact with the dielectric film, the second sheet or roll having a metalized surface and comprising an insulative layer on the metalized surface, wherein the insulative layer does not fully cover the metalized surface such that an edge portion of the metalized surface is uncovered, wherein the second sheet or roll is oriented such that the insulative layer contacts the dielectric film and the uncovered edge portion of the second sheet or roll is proximate the uncovered edge portion of the first sheet or roll to form a composite multilayered surface; (d) winding the composite multilayered surface into a rolled configuration or cutting and stacking portions of the composite multilayered surface to form a stacked configuration; (e) bonding the uncovered edge portions of the first sheet or roll and the second sheet or roll to a conductive polymer contained within a conductive cap or a nonconductive holder having an electrical connection; (f) electrically connecting the composite multilayered surface to a positive electrode and a negative electrode; and (g) applying an electric field to the multilayered composite, the electric field being applied for an effective period of time to bind at least some of the polymeric molecules to the insulative layer of the first sheet or roll, the insulative layer of the second sheet or roll, or both.

In an independent embodiment, a method for making an energy storage device includes (a) providing, in a containment device, a first electrode having an upper surface comprising an insulative layer; (b) positioning a perforated nonconductive separator sheet on the insulative layer of the first electrode; (c) positioning a second electrode having a lower surface comprising an insulative layer on the separator sheet such that the insulative layer of the second electrode contacts the separator sheet; (d) adding a dielectric material to fill spaces within the perforated separator sheet and to contact the first and second electrodes, wherein the dielectric material (i) is electrically insulative and/or exhibits a high permittivity and (ii) comprises a plurality of polymeric molecules having one or more polar functional groups, ionizable functional groups, or a combination thereof; and (e) binding at least some of the polymeric molecules to the insulative layer of the first electrode by applying an electric field across the first electrode, the dielectric material, and the second electrode such that the first electrode is a positive electrode, the electric field being applied for an effective period of time to bind at least some of the polymeric molecules to the insulative layer of the first electrode.

The foregoing and other objects, features, and advantages of the invention will become more apparent from the following detailed description, which proceeds with reference to the accompanying figures.

BRIEF DESCRIPTION OF THE DRAWINGS

FIG. 7 is an optical microscopy photograph of a negative electrode from an energy storage device made by an embodiment of the disclosed method.

FIG. 8 is an optical photograph of a positive electrode from the energy storage device of FIG. 7.

FIG. 9 is an optical photograph of the negative electrode of FIG. 7 after rinsing with running water.

FIG. 10 is an optical photograph of the positive electrode of FIG. 8 after rinsing with running water.

DETAILED DESCRIPTION

Figure 1:
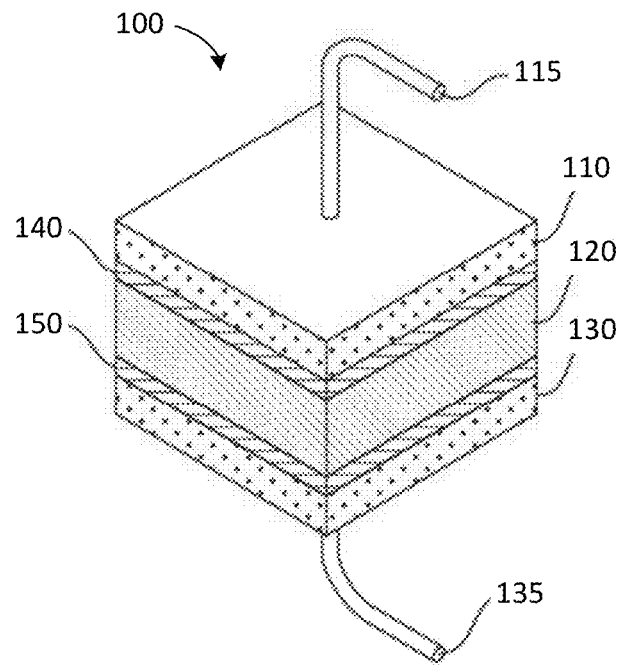
FIG. 1 is a schematic diagram of an exemplary energy storage device.

This disclosure concerns embodiments of energy storage devices including a dielectric material comprising polymeric molecules, wherein at least some of the polymeric molecules are bound to an electrode of the energy storage device, and methods for making the energy storage devices. The energy storage devices store energy via an electrostatic type of charge/discharge mechanism, e.g., similar to an electrostatic capacitor. Embodiments of the energy storage devices are useful in the fields of electronics, bulk electrical storage, and any other device that may use or have need of storing electrical energy.

I. Definitions

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, voltages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

In order to facilitate review of the various embodiments of the disclosure, the following explanations of specific terms are provided:

Capacitor: An energy storage device including two conducting plates separated by a substantially non-conducting material termed a dielectric. The value of the capacitance, or storage capability, of the capacitor depends on the size of the plates, the distance between the plates and the properties of the dielectric. The relationship is shown in Eq. 1:

$$C = \frac{e_0 \cdot e_r A}{d} \quad \text{Eq. 1}$$

where: $e_0$=electrical permittivity of a vacuum ($8.8542 \times 10^{-12}$ F/m), $e_r$=relative permittivity (defined below), A=surface area of one plate (both the same size), and d=distances between two plates.

Dielectric material: An electrical insulator that can be polarized by an applied electric field. As used herein, the term "dielectric material" refers to a material comprising a plurality of polymeric molecules including one or more polar functional groups and/or ionizable functional groups.

Dielectric breakdown voltage: The voltage at which a dielectric material will "break down" and conduct current. The dielectric breakdown voltage is an indicator of the dielectric strength of a material.

Derivatized: As used herein with respect to polymers, the term "derivatized" refers to a polymer to which functional groups have been added through chemical modification. For example, a protein may be derivatized with maleic anhydride to provide the protein with maleic acid functional groups.

Electrically insulative material or insulator: An insulator is a material having internal electric charges that do not flow freely, and therefore the material conducts little or no electric current. Recognizing that perfect insulators do not exist, as used herein, the term "electrically insulative material" refers to a material that is primarily insulative, i.e., a material that has a threshold breakdown field that exceeds an electric field applied across the material during normal use as a capacitor, thus avoiding electrical breakdown during normal use.

Electrode: As used here, the term "electrode" refers to an electrical conductor (e.g., a metal) or to a "composite" electrode comprising an electrical conductor and a nonconductive material on the surface of the electrical conductor.

Functional group: A specific group of atoms within a molecule that is responsible for characteristic chemical reactions and/or electrostatic interactions of the molecule. Exemplary functional groups include, without limitation, halo (fluoro, chloro, bromo, iodo), epoxide, hydroxyl, carbonyl(ketone), aldehyde, carbonate ester, carboxylate, ether, ester, peroxy, hydroperoxy, carboxamide, amine (primary, secondary, tertiary), ammonium, amide, imide, azide, cyanate, isocyanate, thiocyanate, nitrate, nitrite, nitrile, nitroalkane, nitroso, pyridyl, phosphate, sulfonyl, sulfide, thiol(sulfhydryl), and disulfide groups. Polar functional groups do not form ions in the use environment, but instead provide partial separation of positive and negative charges within the molecule. Ionizable functional groups are those that may be in an ionized state (e.g., —COOH vs. —COO$^-$, —NH$_3$ vs. NH$_4^+$) in the use environment.

Insulative or nonconductive layer/coating: As used herein, the terms "insulative layer," "insulative coating," "nonconductive layer," and "nonconductive coating" refer to a layer or coating of a material that is electrically insulative from an Ohmic conductivity standpoint, i.e., the material has an Ohmic conductivity less than $1 \times 10^{-1}$ S/m (Siemens per meter).

Parylene: Polymerized p-xylylene, also known as a Puralene™ polymer, or polymerized substituted p-xylylene. Polymerized p-xylylene satisfies the formula:

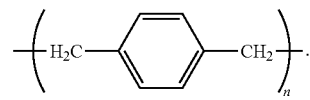

Permittivity: As used herein, the term "permittivity" refers to the ability of a material to become polarized, thereby changing the "dielectric constant" of its volume of space to a higher value than that of a vacuum. The relative permittivity of a material is a measurement of its static dielectric constant divided by the dielectric constant of a vacuum as shown in Eq. 2.

$$e_r = \frac{e_s}{e_0} \quad \text{Eq. 2}$$

where: $e_r$=relative permittivity, $e_s$=measured permittivity, and $e_0$=electrical permittivity of vacuum ($8.8542 \times 10^{-12}$ F/m). A vacuum has a relative permittivity of 1, whereas water has a relativity permittivity of 80.1 (at 20° C.) and an organic coating typically has a relative permittivity of 3-8. Generally, speaking the term "high permittivity" refers to a material having a relative permittivity of at least 3.3. As used herein, the term "high permittivity" also refers to a material having a permittivity enhanced by at least 10% using a permittivity enhancement technique, such as immersion in an electric field.

Oligo: A prefix meaning "a few." For example, an oligopeptide may include 2-20 amino acids joined together through amide bonds, whereas a polypeptide includes more than 20 amino acids. Oligopeptides include dipeptides, tripeptides, tetrapeptides, pentapeptides, etc.

Polar: The term "polar" refers to a compound, or a functional group within a compound, in which electrons are not equally shared between the atoms i.e., areas of positive and negative charges are permanently separated.

Polypeptide: A polymer or more than 20 amino acids joined together through amide bonds. The term polypeptide is intended to cover naturally occurring polypeptides, as well as those that are synthetically produced.

Polymer/polymeric molecule: A molecule of repeating structural units (e.g., monomers) formed via a chemical reaction, i.e., polymerization.

Sterically constrained dielectric film: As used herein, the term "sterically constrained dielectric film" refers to an electrically insulative and/or high permittivity dielectric film comprising a plurality of polymeric molecules having one or more polar functional groups, ionizable functional groups, or a combination thereof, wherein at least some of the polymeric molecules are sterically constrained, i.e., at least some of the polymeric molecules are restricted from physical movement of the entire polymeric molecule within the dielectric material. Steric constraint arises when a portion of the polymeric molecule is bound to an electrode surface in contact with the dielectric film. The polymeric molecule may be bound to the electrode surface by embodiments of the methods disclosed herein.

II. Energy Storage Device with Sterically Constrained Dielectric Film

Embodiments of an energy storage device comprise two conductive surfaces (electrodes) substantially parallel to one another and a sterically constrained dielectric film between the conductive surfaces. The device may further include an insulative layer or coating on one or both of the electrodes. The dielectric material comprises a plurality of polymeric molecules, at least some of which are bound to one of the electrodes, or to an insulative layer on the electrode.

A. Electrodes

In some embodiments, the electrodes are planar or substantially planar. Each electrode independently may have a smooth surface or a rough surface. A rough electrode may be prepared with, for example, carbon particles, which provide the electrode with a much higher surface area than a smooth electrode, such as an electrode made of polished metal. The amount of surface roughness selected may depend, at least in part, upon the external electrical parameters that may be desired for a given energy storage device or electrically capacitive device. Compared to an energy storage device comprising a smooth electrode, a similar energy storage device comprising a rough electrode may have much faster charging and discharging amperages (e.g., 100 times faster) for a brief period of time, such as a few microseconds to milliseconds, followed by a slower discharge rate that is similar to the discharge rate provided by energy storage devices having a smooth electrode.

B. Insulative Layer

Each electrode may be coated on one or more surfaces with an insulative (nonconductive) layer or coating. An electrode having an insulative coating is referred to as a "composite electrode." In the energy storage device, the composite electrode is oriented such that the insulative layer contacts the dielectric material. The insulative layer provides increased insulative properties for the electrode as well as providing binding sites for the dielectric materials to be added. The insulative layer has an Ohmic conductivity less than $1 \times 10^{-1}$ S/m. In some embodiments, the insulative layer has an Ohmic conductivity less than $1 \times 10^{-2}$ S/m, less than $1 \times 10^{-5}$ S/m, or less than $1 \times 10^{-10}$ S/m. In certain embodiments, the Ohmic conductivity is from $1 \times 10^{-25}$ S/m to $1 \times 10^{-1}$ S/m, from $1 \times 10^{-10}$ S/m to $1 \times 10^{-1}$ S/m or from $1 \times 10^{-5}$ S/m to $1 \times 10^{-1}$ S/m. The coating may range from a few nanometers to greater than 10 microns in thickness. In some embodiments, the insulative layer has an average thickness from 5 nm to 10 μm, such as from 0.1-10 μm, 0.3-10 μm, 0.3-5 μm, or 0.3-2 μm. In one embodiment, the coating has an average thickness that is less than 10% of the overall thickness of the capacitor as measured from an outer surface of the first electrode to an outer surface of the second electrode. The insulative coating may applied by any suitable means including, but not limited to, vapor phase deposition, liquid spraying, and other techniques known to one of ordinary skill in the art of applying coatings. An exemplary insulative coating is polymerized p-xylylene, such as a Puralene™ polymer coating as disclosed, for example, in US 2014/0139974.

The insulative layer may be modified with appropriate co-monomers to provide increased permittivity, and/or attachment sites for polymeric molecules of the dielectric material. In some embodiments, the co-monomers include one or more unsaturated bonds. An insulative layer comprising polymerized p-xylylene may be modified, for example, by inclusion of co-monomers including, but not limited to, olefins, vinyl derivatives, alkynyl derivatives, acryl compounds, allyl compounds, carbonyls, cyclic ethers, cyclic acetals, cyclic amides, oxazolines, and combinations thereof. In some embodiments, the co-monomers are acrylates (e.g., 2-carboxylethyl acrylate), methacrylates (e.g., 3-(trimethoxysilyl)propyl methacrylate), α-pinene, R-(−) carvone, linalool, cyclohexene, dipentene, α-terpinene, R-(+)-limonene, and combinations thereof. The copolymers may include alternating monomers or may be in the form of block copolymers.

C. Dielectric Material Comprising Polymeric Molecules

Some embodiments of the energy storage device include a dielectric film comprising a single dielectric material layer, and other embodiments include a dielectric film comprising a multilayer dielectric material. The multilayer dielectric material may be formed with a single material that is deposited multiple times with or without surface modifications between the depositions. Alternatively, each layer may have a different chemical composition. In some embodiments, the device is constructed with a dielectric film comprising two or more dielectric layers having different electrical permittivities. The dielectric film may have an average thickness ranging from a few microns to several millimeters. In some embodiments, the dielectric film has an average thickness from 10 µm to 5 mm, such as from 10 µm to 1 mm, from 10 µm to 500 µm, or from 50 µm to 250 µm. In some embodiments, the dielectric film has an average thickness of 80-120 µm, such as an average thickness of 100 µm.

In some embodiments, the dielectric material has liquid characteristics, and has a viscosity similar to honey or greater. In certain embodiments, the dielectric material has a viscosity from 10,000 cP to 250,000 cP. In an independent embodiment, the dielectric material is a solid.

The dielectric material may be substantially free of conductivity; in other words, the dielectric material does not undergo oxidation/reduction at or near either electrode and does not exhibit Ohmic conductivity. Embodiments of the disclosed energy storage devices therefore are not traditional electrochemical batteries, but are more closely related to an electrostatic capacitor. However, the dielectric material is able to store larger amounts of specific energy for prolonged periods of time than either a traditional electrochemical battery or an electrostatic capacitor.

In some embodiments, the energy storage device comprises a high-permittivity dielectric material that is nonconductive. Two non-limiting examples of nonconductive, high-permittivity dielectrics are zein in a shellac matrix and a protein derivatized with maleic anhydride. In other embodiments, the dielectric material is conductive; in such embodiments, the electrodes typically are coated with an insulative layer as described above to mitigate or prevent Ohmic electrical conduction. An insulative layer may be used, for example, when the dielectric material has a resistance less than 2.5 MΩ per square centimeter. In some embodiments, the energy storage device comprises a dielectric material having a permittivity of at least 10 to 2,000,000 and an Ohmic conduction from 1 S/m to $1 \times 10^{-25}$ S/m.

Embodiments of the disclosed energy storage devices include a dielectric material comprising polymeric molecules having polar and/or ionizable functional groups, resulting in intramolecular dipoles and dipole moments. The polymeric molecules may further include one or more double bonds. In some embodiments, the dielectric material is a film contacting the two electrodes of the energy storage device. Typically, the contact can be described as direct physical contact between the film and entire contacting surface of the electrode. The dielectric material may contact "bare" metal or carbon-based electrode surfaces, or an insulative layer of a composite electrode.

In some embodiments, the polymeric molecules are polar polymers. Proteins are readily available, inexpensive polar polymers that have low toxicity. The low toxicity is a large advantage over other polymers, and allows the energy storage devices to be recycled or incinerated. A protein molecule includes amino acids with polar and/or ionizable functional groups. Other suitable polymers include, but are not limited to, substituted (e.g., fluorinated) and unsubstituted parylene polymers, acrylic acid polymers, methacrylic polymers, polyethylene glycol, urethane polymers, epoxy polymers, silicone polymers, organic terpenoid polymers, natural organic polymers (e.g., resins such as shellac), polyisocyanates, and combinations thereof. Copolymers, such as acrylate copolymers (e.g., copolymers with ethylene butyl-, ethyl-, and methyl-acrylates) and parylene copolymers (e.g., copolymers of p-xylylene with acrylates (e.g., 2-carboxylethyl acrylate), methacrylates (e.g., 3-(trimethoxysilyl)propyl methacrylate), α-pinene, R-(−)carvone, linalool, cyclohexene, dipentene, α-terpinene, R-(+)-limonene, and combinations thereof), also are within the scope of this disclosure. Non-limiting examples of polar polymers include zein, hemp protein, wheat gluten, poly(acrylic acid-co-maleic acid), poly(acrylic acid), whey protein isolate, soy protein isolate, pea protein extract, shellac, and combinations thereof.

In certain embodiments, polymeric molecules are derivatized to attach additional functional groups, such as functional groups that facilitate subsequent binding of the polymeric molecules to a bare electrode surface (i.e., a bare metal or carbon surface) or to a composite electrode surface. Exemplary derivatization agents include, but are not limited to, anhydrides, carbodiimides, imidoesters, and reagents including combinations of N-hydroxysuccinimide and maleimide, aryl azide, or diazirine groups. In some examples, the polymer is derivatized with an anhydride, such as maleic anhydride, itaconic anhydride, cis-4-cyclohexene-1,2-dicarboxylic anhydride, or cis-5-norbornene-end-2,3-dicarboxylic anhydride. A derivatized polymeric molecule can be bound to the electrode surface by crosslinking or by other reaction with the surface. When a polymeric molecule is derivatized with maleic anhydride, for example, the derivatized polymeric molecule can be crosslinked through the double bonds. Crosslinking can be performed by any suitable means, such as a chemical agent (e.g., a radical initiator), ultraviolet light activation, or thermal activation.

The inventors surprisingly discovered that polymeric molecules with the above-described characteristics, when sterically constrained, can be used for energy storage even though the polymeric molecules cannot freely move between the electrodes. Polymeric molecules can be sterically constrained by binding the polymeric molecules to a bare electrode surface or to a nonconductive or insulative coating of a composite electrode by any means, including a covalent bond (single or multiple), van der Waals forces, or hydrogen bonding, prior to charging and/or discharging an energy storage device including the electrode and a dielectric material comprising the polymeric molecules. In some embodiments, the polymeric molecules are bound to the positive electrode. The polymeric molecules remain bound to the electrode as the energy storage device charges and discharges during subsequent use, such as when the energy storage device is used subsequently in an electronic circuit.

In an energy storage device comprising a dielectric material, imposition of an external electric field from the electrode leads to disruption of the lowest energy state of an ion or dipole attainable from its current position in the dielectric material layer. Thus, when the electric field is applied, the dipole or ion is moved from its rest position (i.e., its position before the electric field is applied), which in turn leads to a rearrangement of the charge distribution in the material. This leads to other rearrangements of all other dipoles continuing throughout the dielectric material. Energy that is not converted into heat is absorbed by the dielectric material. When the energy is released, a reverse of this process can take place provided the energy stored is not released through other mechanisms such as increased thermal motions (random molecular motion, which is proportional to temperature).

Without wishing to be bound by any particular theory of operation, it is believed that within a large molecule, movements of only portions of the molecule may take place while other portions of the molecule are bound in place sufficiently to prevent the overall movement to a lower energy level and subsequent release of potential energy to be coupled to the electrode and not released as thermal motion. This constraint of movement decreases the degrees of freedom in the dielectric molecule, and consequently decreases the molecule's ability to dissipate absorbed energy from the electrical field as heat. Thus, a bound polymeric molecule couples to the electric field in such a way that the polymeric molecule cannot release energy in the form of heat due its reduced degrees of freedom. The movement of certain portions of a macromolecule can be related and is similar to electrophoretic movements known to those who use such techniques to analyze biological macromolecules.

Without wishing to be bound by any particular theory of operation, it is believed that when a portion of the polymer is bound to the electrode (or to a coating on the electrode), the remainder of the polymer may stretch, twist, or bend within the dielectric film as polar and/or ionizable functional groups reorient in response to an electric field. These changes in conformation and position store energy within the energy storage device. When the energy storage device discharges, the stored energy is released as electrical energy as the bound polymer molecules return to a less ordered conformation. A dielectric material comprising polymeric molecules, wherein at least some of the polymeric molecules have decreased degrees of freedom, is referred to as a "sterically constrained dielectric film."

Thus, embodiments of the disclosed energy storage devices include a sterically constrained dielectric material comprising polymeric molecules. In some embodiments, at least 1%, at least 10%, at least 25%, at least 50%, at least 80%, or at least 90% of the polymeric molecules in the sterically constrained dielectric material are bound to an electrode. In certain embodiments, at least some of the polymeric molecules are bound to the positive electrode. When the electrode is a composite electrode, the polymeric molecules are bound to the insulative layer of the composite electrode. The percentage of binding can be estimated by measuring the quantity of polymeric molecules rinsed off the electrode after binding at least some of the polymeric molecules to the electrode.

In some embodiments, polymeric molecules are bound to at least 1%, at least 25%, at least 50%, at least 80%, or at least 90% of the positive electrode surface in contact with the dielectric material. The percentage of surface covered by bound polymers may be visually estimated, for example, by optical microscopy. After the energy storage device has been made, the device may be disassembled for inspection. The positive electrode is washed, such as by exposure to running water, to remove unbound material and then examined by optical microscopy. Areas of the surface covered by bound polymers are readily distinguishable from areas devoid of bound polymers.

The bonds between the polymeric molecules and the electrode are sufficiently strong to withstand casual disruption, such as by washing the electrode and bound polymeric molecules with running water having a force equivalent to water falling from a height of one meter or by manually rubbing the bound polymeric molecules under running water with a force less than 20 N. Binding with such strength is observed only when an electric field has been applied across the energy storage device while making the device. In some embodiments, at least some of the bonds may be broken by applying an external voltage to the device in a reversed polarity so that the positive electrode becomes negative.

D. Exemplary Energy Storage Devices

Figure 2:
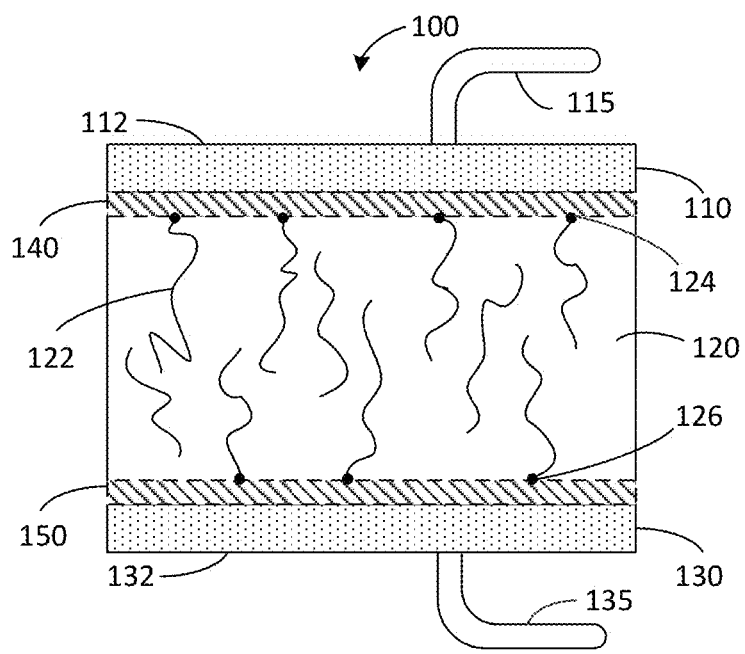
FIG. 2 is a schematic cross-sectional diagram of an exemplary energy storage device.

In some embodiments, an energy storage device 100 comprises a positive electrode 110, a sterically constrained dielectric layer 120, and a negative electrode 130 (FIGS. 1, 2). The positive electrode 110 and the negative electrode 130 independently may be conductive metal, semiconductor, conductive polymer or other electrically conductive material. In certain cases it is advantageous for this material to be a high surface area conductor such as a carbon-based or graphene type of electrode. The sterically constrained dielectric layer 120 comprises a film material that (i) is electrically insulative and/or exhibits a high permittivity and (ii) comprises a plurality of polymeric molecules 122 including polar functional groups and/or ionizable functional groups. The polymeric molecules also may include one or more double bonds. Optionally, an insulative layer 140, 150 is disposed between the positive electrode 110 and the dielectric layer 120 and/or between the dielectric layer 120 and the negative electrode 130. In some embodiments, the insulative layer 140, 150 may have a thickness that is less than 10% of the overall thickness of the energy storage device 100, as measured from an outer surface 112 of the first electrode 110 to an outer surface 132 of the second electrode 130. An insulative layer may be included to prevent Joule heating and/or Ohmic conductive losses from occurring during use of the device. At least some of the polymeric molecules 122 are bound to the positive electrode 110 (or insulative layer 140, if present) via attachment points 124. Each attachment point 124 may be a covalent bond (single, double, or triple), a hydrogen bond, van der Waals forces, or other bonding force that is strong enough to prevent disassociation of the polymeric molecule 122 from the positive electrode 110, assuming that the positive electrode 110 is maintained at a positive charge relative to the negative electrode 130. Some of the polymeric molecules 122 may be bound to the negative electrode 130 (or insulative layer 150, if present) via attachment points 126. Each attachment point 126 may be a covalent bond (single, double, or triple), a hydrogen bond, van der Waals forces, or other bonding force that is strong enough to prevent disassociation of the polymeric molecule 122 from the negative electrode 130, assuming that the negative electrode 130 is maintained at a negative charge relative to the positive electrode 110. The positive and negative electrodes 110, 130 may be attached to a voltage source via conductive leads 115, 135 (e.g., conductive wire leads, traces, or other pathways).

Figure 3:
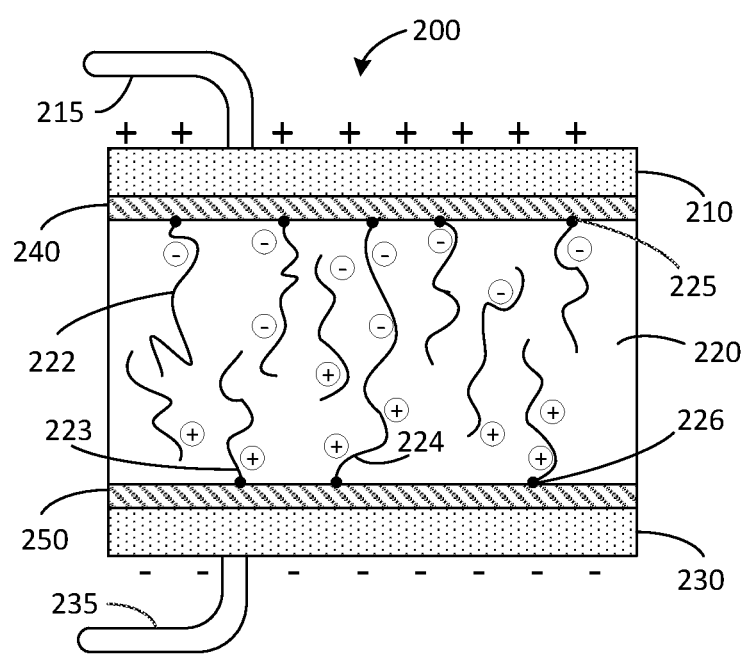
FIG. 3 is a schematic cross-sectional diagram of another exemplary energy storage device.

In an independent embodiment, an energy storage device 200 comprises a positive electrode 210, a sterically constrained dielectric layer 220, and a negative electrode 230 (FIG. 3). The sterically constrained dielectric layer 220 comprises a film material that (i) is electrically insulative and/or exhibits a high permittivity and (ii) comprises a plurality of polymeric molecules 222, 223, 224 including polar functional groups and/or ionizable functional groups. The polymeric molecules also may include one or more double bonds. Insulative or non-conducting layers 240, 250 are disposed between the positive electrode 210 and the dielectric layer 220 and between the dielectric layer 220 and the negative electrode 230. Some of the polymeric molecules 222 have polar and/or ionizable functional groups with a negative or partial negative charge, and are bound to the insulative layer 240 via attachment points 225. Some of the polymeric molecules 223 have polar or ionizable functional groups with a positive or partial positive charge, and are bound to the insulative layer 250 via attachment points 226. Some of the polymeric molecules 224 have at least one polar or ionizable group with a positive or partial positive charge and at least one polar or ionizable group is a negative or partial negative charge. Polymeric molecules 224 of sufficient length may span the distance between insulative layers 240 and 250 and may be bound to both insulative layers. The positive and negative electrodes 210, 230 may be attached to a voltage source via conductive leads 215, 235.

Figure 4:
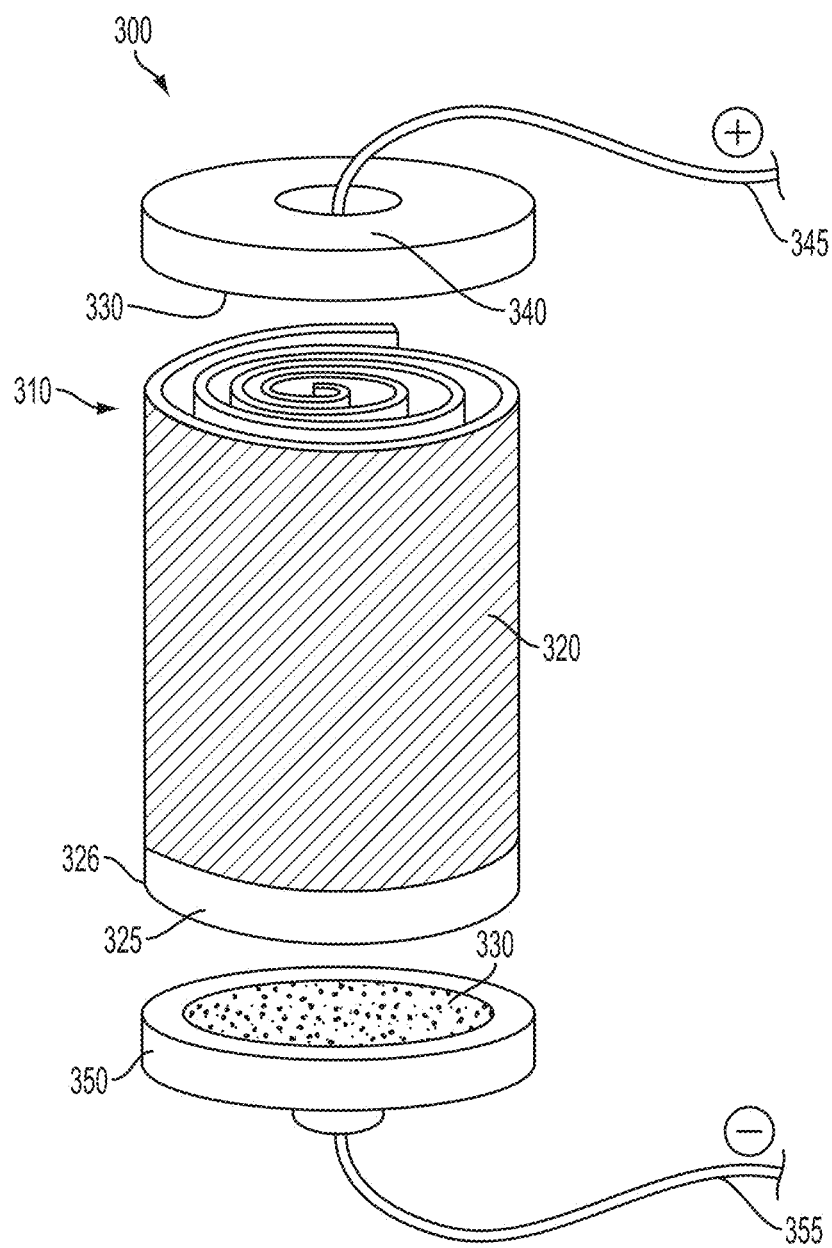
FIG. 4 is a schematic, exploded diagram of an exemplary energy storage device having a rolled configuration.

In one exemplary embodiment, an energy storage device has a rolled or stacked configuration of dielectric layers. FIG. 4 illustrates an exemplary energy storage device 300 with an electrode 310 having a rolled configuration comprising a sterically constrained dielectric layer 320 on a substrate 325. A second substrate (not shown) may be positioned atop the dielectric layer 320 such that the sterically constrained dielectric layer 320 is sandwiched between the two substrates. As shown in FIG. 4, the sterically constrained dielectric layer 320 does not extend to one edge 326 of the substrate 325. The top and bottom of the rolled electrode 310 are bonded to a conductive polymer 330, which may be contained within caps or holders 340, 350 that have electrical connections 345, 355. An optional sleeve (not shown) may be placed around the device 300 to provide mechanical and electrical protection during use.

Figure 5:
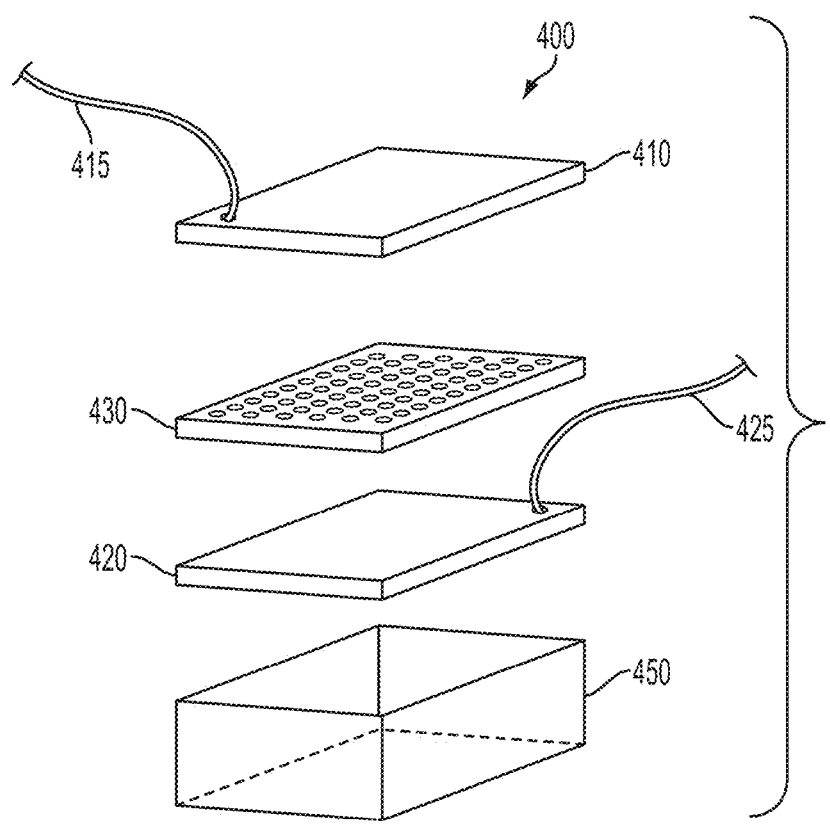
FIG. 5 is a schematic, exploded diagram of an exemplary energy storage device including a perforated separator plate.
Figure 6:
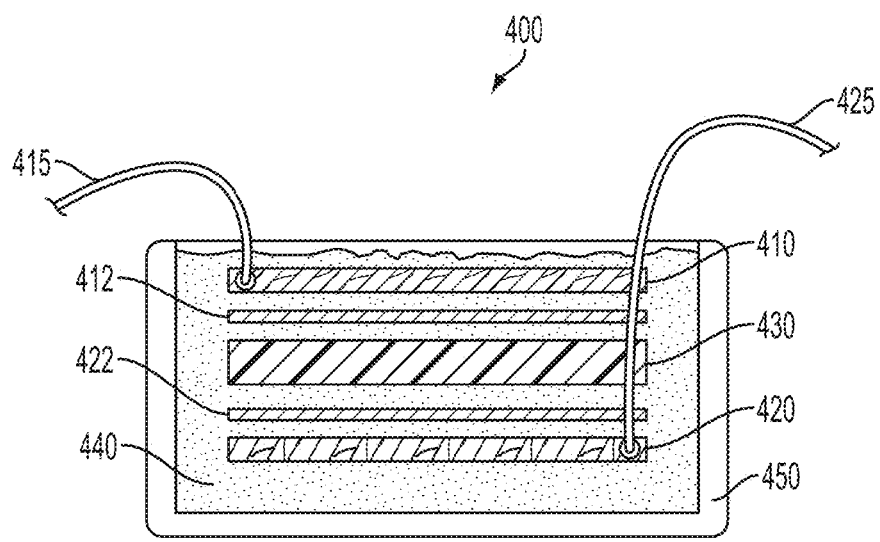
FIG. 6 is a cross-sectional side view of the energy storage device of FIG. 5.

In an independent embodiment shown in FIGS. 5 and 6, an exemplary energy storage device 400 includes two electrodes 410, 420. The electrodes 410, 420 may be conductive sheets. In some examples, the conductive sheets are metal (e.g., aluminum), and may have a size of approximately 500 mm² with a thickness of approximately 2 mm. Each sheet is covered with an insulative layer 412, 422, such as a Puralene™ polymer coating to produce an electrode.

A conductive lead 415, 425 is attached to each electrode 410, 420 and insulated to prevent unwanted conduction in the areas in contact with a dielectric material. A nonconductive separator sheet 430 of approximately the same size as the electrodes is perforated to provide a path for a dielectric material 440 to fill and contact the electrodes 410, 420. In some examples, the separator sheet 430 has a thickness of about 0.5 mm, but greater thicknesses up to 2 mm and above are acceptable depending upon the voltages applied. The separator sheet prevents the two electrodes 410, 420 from contact with one another and provides for a constant spacing for the two electrodes. The electrodes are assembled as illustrated in FIG. 6 in a containment box 450. A solid dielectric or liquid dielectric material 440 is added to fill the space between the electrodes 410, 420. Alternatively, the dielectric material may be precoated onto the electrodes. The dielectric material 440 comprises a plurality of polymeric molecules including polar functional groups and/or ionizable functional groups. The polymeric molecules also may include one or more double bonds. Voltage is applied to the two electrodes to bind at least some of the polymeric molecules to the positive electrode, thereby producing a sterically constrained dielectric material.

In some embodiments, binding at least some of the polymeric molecules to the first electrode by application of an electric field and/or treatment with a chemical agent, prior to charging and/or discharging the energy storage device (i.e., prior to using the energy storage device, such as in an electronic circuit, after the device has been made), improves the permittivity of the sterically constrained dielectric material by at least 50%, such as from 50% to 10,000%, from 50% to 100,000%, from 50% to 1,000,000%, or even from 50% to 10,000,000% and above, compared to a permittivity of the dielectric material in an analogous energy storage device in which the polymeric molecules are not bound to the first electrode, i.e., an analogous energy storage device in which the dielectric material is not sterically constrained prior to charging and/or discharging the energy storage device. Embodiments of the disclosed energy storage devices can store at least 100×, 1000×, 10,000×, or even 100,000× the amount of energy stored by a comparable energy storage device including a dielectric material having substantially the same chemical composition, but in which polymers are not sterically constrained by binding at least some of the polymers to an electrode surface prior to charging and/or discharging the energy storage device. In some embodiments, the disclosed energy storage devices can store from 100× to 100,000×, such as from 100× to 10,000×, from 100× to 20,000×, or from 100× to 100,000× the amount of energy stored by the comparable energy storage device. Some embodiments of the disclosed energy storage devices have an energy storage capacity, in the absence of the energy storage device having been charged and/or discharged, of at least 1 Wh/kg, at least 10 Wh/kg, or at least 100 Wh/kg based solely on the weight of dielectric material disposed between the electrically conductive first and second electrodes, such as an energy storage capacity from 1 Wh/kg to 1300 Wh/kg, from 10 Wh/kg to 1300 Wh/kg, or from 100 Wh/kg to 1300 Wh/kg. In certain embodiments, the energy storage capacity is within a range of 100 Wh/kg to 1300 Wh/kg. Some embodiments of the disclosed energy storage devices have an energy loss of less than 10% per hour, less than 1% per hour, less than 0.5% per hour, or even less than 0.1% per hour. The disclosed energy storage devices thus are robust, high energy density capacitors. The high energy density also allows the devices to be made with thicker dielectric films than other capacitors without sacrificing energy storage.

III. Methods of Making Energy Storage Devices

Embodiments of a method for making an energy storage device include (a) applying a dielectric film to an electrically conductive first electrode, the dielectric film comprising a film material that (i) is electrically insulative and/or exhibits a high permittivity and (ii) comprises a plurality of polymeric molecules having one or more polar functional groups, ionizable functional groups, or a combination thereof; (b) contacting the dielectric film with an electrically conductive second electrode; and (c) applying an electric field across the first electrode, the dielectric film, and the second electrode, thereby making the energy storage device. At least some of the polymeric molecules are bound to the first electrode while making the energy storage device by applying the electric field across the first electrode, the dielectric film, and the second electrode, thereby producing a sterically constrained dielectric film in which at least some of the plurality of polymeric molecules are bound to a surface of the first electrode, second electrode, or both the first and second electrodes. In some embodiments, a sterically constrained dielectric film is produced by (i) applying an electric field across the first electrode, the dielectric film, and the second electrode such that the first electrode is a positive electrode, the electric field being applied for an effective period of time to bind at least some of the polymeric molecules to the first electrode, (ii) treating the dielectric film with a chemical agent, or (iii) a combination thereof.

A. Dielectric Film Formation

A dielectric film comprising a film material is prepared by any suitable means, including vapor phase deposition, liquid spraying, screening, spin-coating, or other methods known to those skilled in the art of film formation, and applied to an electrically conductive first electrode. In one embodiment, the electrically conductive first electrode is a bare electrode or a composite electrode comprising an insulative layer, and the dielectric film is formed directly on the bare electrode surface or on the insulative layer of the composite electrode. The dielectric film is then dried at low temperatures (e.g., 25-60° C.) before or after contacting the dielectric film with an electrically conductive second electrode. In an independent embodiment, the dielectric film is formed on a removable carrier film (e.g., a polytetrafluoroethylene film), dried, and subsequently transferred to the electrode surface.

In some embodiments, the film material is prepared from a liquid or a slurry comprising a solvent and a plurality of polymeric molecules. Suitable solvents include, but are not limited to, alkanols, alkylene glycols, water, and combinations thereof. Exemplary solvents include ethanol, ethylene glycol, water, and combinations thereof. In some embodiments, the polymeric molecules have one or more polar functional groups, ionizable functional groups, or a combination thereof. The polymeric molecules may also include one or more double bonds. Suitable polymeric molecules are described above. In certain embodiments, undissolved polymeric molecules are removed from the mixture, e.g., by filtering or centrifuging the mixture.

The liquid or slurry may further comprise a crosslinking agent. Suitable crosslinking agents include, but are not limited to, anhydrides, carbodiimides, imidoesters, borax salts, sodium borohydride, and reagents including combinations of N-hydroxysuccinimide and maleimide, aryl azide, or diazirine groups. Common crosslinking agents include triallyltriazinetrione and other triallyl or trivinyl reagents known to those versed in polymer chemistry. Exemplary anhydrides include maleic anhydride, itaconic anhydride, cis-4-cyclohexene-1,2-dicarboxylic anhydride, cis-5-norbornene-endo-2,3-dicarboxylic anhydride, and combinations thereof.

In some embodiments, the liquid or slurry further includes an initiator, such as a radical initiator, to catalyze crosslinking between the polymeric molecules. Exemplary initiators include thermal and light-activated chemical initiators, including, but not limited to, azobisisobutyronitrile, 1,1'-azobis(cyclohexanecarbonitrile), dicumyl peroxide, 2-hydroxy-2-methylpropiophenone, camphorquinone, phenanthrenequinone, and combinations thereof. In one example, itaconic anhydride and dicumyl peroxide were used to crosslink zein molecules.

One or more salts, such as salts capable of forming organic salts with the polymeric molecules and/or neutralizing the film material, may be added to the liquid or slurry before crosslinking is complete. In some embodiments, a carbonate salt (e.g., guanidine carbonate, cesium carbonate, strontium carbonate, or a combination thereof) may be used because the reaction releases carbon dioxide and produces no undesired counterion contamination of the dielectric film. In one embodiment, barium titanate is added to the liquid or slurry. In an independent embodiment, a voltage adjuvant, such as a nonconductive polymer, is added.

The liquid or slurry is applied to the electrically conductive first electrode by any suitable means. In one embodiment, the slurry is coated onto a stationary or continuous moving strip of an electrode. In another embodiment, the liquid or slurry is poured onto a statically positioned electrode plate through any number of means such as but not limited to pressure ejected from a container or poured from the mixing container. In another embodiment, the liquid or slurry is applied to the electrode by spin coating. Other methodologies for moving the liquid or slurry from the mixing container to the electrode are anticipated. The liquid or slurry may be spread, pressed or rolled to cover the electrode surface and ensure an even thin coating of the liquid or slurry on the electrode surface. Multiple means for performing this step are envisioned including, but not limited to, the use of a spreading blade, roller, or other means. Gas phase deposition of the slurry can be accomplished through atomization of the slurry or chemical vapor deposition as known to those skilled in the art of film formation.

In one embodiment, a sufficient amount of liquid or slurry is applied to the electrode surface to produce a dielectric film of the desired thickness when dried. In another embodiment, two or more layers of liquid or slurry may be applied to the electrode surface to provide the desired thickness. Each layer may be dried before another layer is applied, or sequential depositions of liquid or slurry may be performed with drying after all layers have been applied. When two or more layers are applied, the layers may have the same or different chemical compositions.

The electrode and dielectric material may be heated to remove solvent and form a dielectric film on the electrode surface. Heating may take place before or after contacting the dielectric material with the electrically conductive second electrode. In some embodiments, the assembly is clamped or pressed to apply pressure to the dielectric material and force any air or gas out of the liquid or slurry so that the first and second electrodes are in complete, intimate contact with inwardly facing surfaces of the electrodes. In certain embodiments, the assembly is heated to a temperature of 150° C. to 300° C. to remove the solvent. Other temperature ranges may be suitable depending on the particular solvent.

In an independent embodiment, the polymeric molecules of the dielectric film are formed in situ. The dielectric material liquid or slurry comprises a crosslinking agent and a plurality of polymeric molecule precursors comprising one or more polar functional groups, ionizable functional groups, or a combination thereof. In some examples, the precursors are amino acid molecules, oligopeptides, polypeptides, or a combination thereof. In certain embodiments, the polymeric molecule precursors further comprise p-xylylene monomers. The liquid or slurry is applied to the first electrode as previously described. After application, the crosslinking agent is activated, thereby crosslinking the polymeric molecule precursors to provide a dielectric film comprising a plurality of polymeric molecules. The crosslinking process also may bind some of the polymeric molecules to the electrode surface, such as when the electrode is a composite electrode comprising an insulative layer.

B. Insulative Layer Formation

In some embodiments, the method further comprises applying an insulative layer to the first electrode to form a composite first electrode, and then applying the dielectric film to the insulative layer of the composite first electrode. In one embodiment, the insulative layer comprises polymerized p-xylylene. In another embodiment, the insulative layer comprises copolymers of p-xylylene and other co-monomers as described above. The insulative layer is applied by any suitable means, including vapor phase deposition, liquid spraying, screening, spin-coating, or other methods known to those skilled in the art of film formation.

In some embodiments, the insulative layer is applied using vapor phase deposition. When the insulative layer comprises polymerized p-xylene, xylene may be reacted with a monatomic oxygen source to produce p-xylylene in monomeric form. By way of example, the monatomic oxygen source may comprise nitrous oxide or ionized diatomic oxygen. In some embodiments, the step of reacting xylene with a monatomic oxygen source to produce p-xylylene in monomeric form is performed at atmospheric pressure, in an environment heated to 450° C. to 800° C., at stoichiometric ratio of xylene to monatomic oxygen source. The reaction may take place in an electrically heated pyrolysis reaction tube, such as an Inconel (nickel alloy 600) pyrolysis reaction tube. A flowing stream of inert gas such as argon or nitrogen gas alone, or with a reactive compound such as nitrous oxide, is supplied to the pyrolysis reaction tube. A starting material, e.g., xylene vapor, is introduced into the pyrolysis reaction tube and reacts with monatomic oxygen in the reaction tube. Being very reactive and transient, monatomic oxygen must be available to react with the volatile mixture in the reaction chamber 215. As discussed above, the source of monatomic oxygen may be a gaseous compound supplied with the carrier gas, or a gaseous compound supplied separately, or another source, such as a plasma generator. Monatomic oxygen plasma may be created by exposing oxygen ($O_2$) gas to an ionizing energy source, such as an RF discharge, which ionizes the gas. Alternatively, a compound such as nitrous oxide ($N_2O$) may supply monatomic oxygen for the reaction through thermal, catalyzed, and/or other decomposition. Thus, a monatomic oxygen plasma generator, or a monatomic oxygen chemical compound (e.g., $N_2O$) feed, or another suitable source of monatomic oxygen is provided. A plasma gas can be used with the aforementioned starting materials to form the intermediate oxidized products that may subsequently react to form reaction products that are oxidized forms of the starting materials which may be monomers, dimers, trimers, oligomers, or polymers. At temperatures of 300° C. to 800° C., the output of the reaction tube is sufficiently hot to maintain the monomer p-xylylene in monomeric form. Rapidly cooling of the monomer on an electrode surface results in a liquid condensation of the monomer and rapid polymerization of the monomer into a polymer. A device to mix cool nonreactive gases into the hot reaction stream may be used to reduce the temperature and facilitate condensation of the reactive intermediate exiting the reaction tube. Optionally an expansion valve may be used at the exit of the reaction tube to provide Joule-Thomson cooling of the hot gas. Optionally, the deposited mixture may be exposed to a photoinitiating light energy and/or a permittivity-enhancing field, such as a magnetic and/or electric field.

The method may be extended to other substituents, including, but not limited to, 2-chloro-1,4-dimethylbenzene, 2,5-dichloro-p-xylene, 2,5-dimethylanisole, tetrafluoro-p-xylene, and 1,2,4-trimethyl benzene. Meta and ortho orientations of the substituents on the aromatic rings are also viable reaction starting materials. The reaction can be generalized to include all compounds that are capable of reaction with monatomic oxygen produced from a plasma or from decomposed oxygen-containing substances or its intermediate reaction products and also contain hydrogen atoms stabilized by the presence of an aromatic ring. Typically such hydrogen atoms are located in a position alpha to a phenyl ring (benzylic position). Michael structures removed from the alpha aromatic ring positions are known to give similar reactivity to the hydrogen alpha to the aromatic ring position as is well known to those versed in organic synthesis. However, the reactivity of such hydrogen atoms is not limited to alpha and/or Michael positions from an aromatic ring or the aromatic ring such as benzene. Other aromatic stabilizations are known for many different rings, fused rings, and non-ring systems, as known to those versed in the art of organic chemistry. Such starting materials may preferably have the presence of two hydrogen atoms that are capable of being removed to form partially oxidized starting materials. These preferred materials may optionally have the ability to dimerize, trimerize, oligomerize, or polymerize.

When the insulative layer comprises a copolymer including p-xylene, xylene may be reacted with a monatomic oxygen source to produce p-xylylene in monomeric form. By way of example, the monatomic oxygen source may comprise nitrous oxide or ionized diatomic oxygen. Monatomic oxygen plasma may be created by exposing oxygen ($O_2$) gas to an ionizing energy source, such as an RF discharge, which ionizes the gas. Alternatively, a compound such as nitrous oxide ($N_2O$) may supply monatomic oxygen for the reaction through thermal, catalyzed, and/or other decomposition. In a preferred implementation, the step of reacting xylene with a monatomic oxygen source to produce p-xylylene in monomeric form is performed at atmospheric pressure, in an environment heated to 350° C. to 800° C., at stoichiometric ratio of xylene to monatomic oxygen source. The reaction may take place in an electrically heated pyrolysis reaction tube, such as an Inconel (nickel alloy 600) pyrolysis reaction tube. The p-xylylene in monomeric form is mixed with a copolymerization compound (co-monomer), i.e., a compound that copolymerizes with the p-xylylene in monomeric form. The p-xylylene in monomeric form and the copolymerization compound are in gaseous form while mixing. A plasma gas may be used with the aforementioned starting materials to form intermediate oxidized products that may subsequently react to form reaction products, which are oxidized forms of the starting materials. After mixing the p-xylylene in monomeric form with a copolymerization compound, the resulting mixture may be trapped in a condenser. The condenser has a temperature at which condensation of the mixture takes place. A temperature of at least −30° C., e.g., in the range of −30° C. to 400° C., allows condensation for most such mixtures. The condenser contains a solvent to facilitate trapping. Optionally, the trapped mixture may be mixed with a tertiary substance, e.g., another monomer, a reactive substance or an inert material. After mixing the p-xylylene in monomeric form with a copolymerization compound, the resulting mixture may be deposited on an electrode. The temperature of the electrode may be controlled to promote solidification of the deposited mixture. Rapidly cooling of the monomers (whether modified or unmodified) while directing the monomers onto an electrode surface results in a liquid condensation of the monomers and rapid polymerization of the monomers into a polymer. Optionally, the deposited mixture may be exposed to a photoinitiating light energy and/or a permittivity-enhancing field, such as a magnetic and/or electric field.

C. Binding Polymeric Molecules to the Electrode

In some embodiments, an electric field is applied across the first electrode, the dielectric film, and the second electrode. The electric field is applied such that the first electrode functions as the positive electrode and the second electrode functions as the negative electrode. The electric field strength may be greater than 100 V/cm, or at least 0.001 V/µm, based on an average thickness of the dielectric film. In certain embodiments, the electric field strength is from 0.005-1 V/µm, 0.01-1 V/µm, 0.1-1 V/µm or 0.4-0.6 V/µm.

The electric field may be applied for an effective period of time to bind at least some of the polymeric molecules in the dielectric film to the first electrode, thereby producing a sterically constrained dielectric film. The effective period of time is based at least in part on the electric field strength and may range from one second to several minutes, such as from 30 seconds to 60 minutes, from 5 minutes to 30 minutes, or from 5 minutes to 15 minutes. In some embodiments, the electric field is 0.005-1 V/µm and the effective period of time is from 1 second to 30 minutes. In one embodiment, an electric field strength of 0.005-0.5 V/µm for 20 minutes is effective to bind more than 50% of protein molecules to a composite electrode surface comprising polymerized p-xylylene. In another embodiment, an electric field strength of 0.5-1 V/µm for 5-15 minutes is effective to bind more than 90% of protein molecules to a composite electrode surface comprising polymerized p-xylylene.

In some embodiments, after assembling the first electrically conductive electrode, dielectric film, and second electrically conductive electrode the dielectric film is treated with a chemical agent to bind at least some of the polymeric molecules to the first electrode, thereby producing a sterically constrained dielectric film. In certain embodiments, an electric field is applied across the first electrode, dielectric film, and second electrode, and the dielectric film is treated with a chemical agent.

In one embodiment, the first electrode is a composite electrode and treating the dielectric film with a chemical agent comprises applying a radical initiator to the insulative layer before applying the dielectric film to the insulative layer, and then activating the radical initiator to bind at least some of the polymeric molecules to the insulative layer and produce a sterically constrained dielectric film. Exemplary radical initiators include azobisisobutyronitrile, 1,1'-azobis (cyclohexanecarbonitrile), dicumyl peroxide, 2-hydroxy-2-methylpropiophenone, camphorquinone, phenanthrenequinone, combinations thereof, and other radical initiators known to one skilled in the art of polymerization. The radical initiator is activated by oxidation-reduction, photoinitiation, thermal initiation, or other methods known to those skilled in the art of polymerization, thereby binding at least of the polymeric molecules to the insulative layer.

In an independent embodiment, the first electrode is a composite electrode and treating the dielectric film with a chemical agent comprises including a radical initiator in the film material of the dielectric film, and activating the radical initiator after applying the dielectric film to the insulative layer.

In an independent embodiment, the first electrode is a composite electrode and treating the dielectric film with a chemical agent comprises derivatizing the polymeric molecules with a derivatization agent to provide functional groups capable of cross-linking to the insulative layer of the composite first electrode, and subsequently crosslinking the functional groups to the insulative layer by using a radical initiator, ultraviolet light, thermal activation, or a combination thereof, thereby producing a sterically constrained dielectric film. Exemplary derivatization agents include anhydrides, carbodiimides, imidoesters, and reagents including combinations of N-hydroxysuccinimide and maleimide, aryl azide, or diazirine groups. In some embodiments, the derivatization agent is an anhydride, such as maleic anhydride, itaconic anhydride, cis-4-cyclohexene-1, 2-dicarboxylic anhydride, or cis-5-norbornene-end-2,3-dicarboxylic anhydride.

In an independent embodiment, the first electrode is a composite electrode and treating the dielectric film with a chemical agent comprises applying a plasma to the surface of the insulative layer before applying the dielectric film to the insulative layer. The plasma is made by passing a carrier gas (e.g., nitrogen or argon) with oxygen through a high voltage "spark" plasma. The voltage drop across the spark is approximately 100 V to 1000 V at 250 kHz. Alternatively, a high-frequency plasma can be made at much lower voltage (e.g., 13.6 MHz and <100 V) using the same gas mixture. The plasma creates monoatomic oxygen that lasts sufficiently long (e.g., a few milliseconds) to oxidize p-xylene. Polymeric molecules in the dielectric film react with the plasma, thereby binding at least some of the polymeric molecules to the insulative layer and forming a sterically constrained dielectric film.

One or more of the above embodiments for treating the dielectric film with a chemical agent may be used in combination. For example, the polymeric molecules may be derivatized with a derivatization agent, a crosslinking agent may be included in the film material, and a radical initiator may be included in the film material or applied to the insulative layer before applying the dielectric film and subsequently activated.

D. Methods of Making Alternate Assemblies

In one embodiment, a method for making an energy storage device as shown in FIG. 4 includes (i) providing a first sheet or roll of polymer having a metalized surface and comprising an insulative layer as disclosed herein on the metalized surface, wherein the insulative layer does not fully cover the metalized surface such that an edge portion of the metalized surface is uncovered; (ii) applying a dielectric film as disclosed herein to the insulative layer; (iii) bringing a second sheet or roll of metalized polymer into contact with the dielectric film, the second sheet or roll having a metalized surface and comprising an insulative layer on the metalized surface, wherein the insulative layer does not fully cover the metalized surface such that an edge portion of the metalized surface is uncovered, wherein the second sheet or roll is oriented such that the insulative layer contacts the dielectric film and the uncovered edge portion of the second sheet or roll is proximate the uncovered edge portion of the first sheet or roll to form a composite multilayered surface; (iv) winding the composite multilayered surface into a rolled configuration or cutting and stacking portions of the composite multilayered surface to form a stacked configuration; (v) bonding the uncovered edge portions of the first sheet or roll and the second sheet or roll to a conductive polymer contained within a conductive cap or a nonconductive holder having an electrical connection; (vi) electrically connecting the composite multilayered surface to a positive electrode and a negative electrode; and (vii) applying an electric field to the multilayered composite, the electric field being applied for an effective period of time to bind at least some of the polymeric molecules of the dielectric film to the insulative layer of the first sheet or roll, the insulative layer of the second sheet or roll, or both.

In an independent embodiment, a method for making an energy storage device as shown in FIGS. 5 and 6 includes (i) providing, in a containment device, a first electrode having an upper surface comprising an insulative layer as disclosed herein; (ii) positioning a perforated nonconductive separator sheet on the insulative layer of the first electrode; (iii) positioning a second electrode having a lower surface comprising an insulative layer as disclosed herein on the separator sheet such that the insulative layer of the second electrode contacts the separator sheet; (iv) adding a dielectric material as disclosed herein to fill spaces within the perforated separator sheet and to contact the first and second electrodes; and (v) binding at least some of the polymeric molecules of the dielectric material to the insulative layer of the first electrode by applying an electric field across the first electrode, the dielectric material, and the second electrode for an effective period of time to bind at least some of the polymeric molecules to the insulative layer of the first electrode.

IV. Examples

Example 1

Preparation of Dielectric Films

Materials:

Proteins/Polymers/Amino acids: Zein (Sigma-Aldrich CAS #9010-66-6), Hemp protein (Manitoba Harvest Hemp Foods, Winnipeg, Manitoba, Canada, Hemp Pro 70), Vital Wheat Gluten (John & Jennie's Gourmet Kitchen Center, Salt Lake City, Utah, jandjkitchen.com), Poly(acrylic acid-co-maleic acid) (Sigma-Aldrich CAS #52255-49-9), Poly (acrylic acid) (Sigma-Aldrich CAS #9003-01-4), Whey Protein Isolate (Purebulk.com Lot #20131025-07-1000g), Soy Protein Isolate (Honeyville Food Products, Honeyville, Utah Item #30-066-904), Gamma aminobutyric acid (GABA) (Purebulk.com Lot #20130722-01), Pea protein extract 85% (Purebulk.com Lot #20140226-06-1000g), L-lysine HCl (Purebulk.com Lot #20131125-01-1000g), L-serine (Purebulk.com Lot #20130606-04), L-glutamine (Purebulk.com Lot #20130912), L-tryptophan (Purebulk.com Lot #20131015-04-100g), L-tyrosine (Purebulk.com Lot #20131016-08-1000g), Aspartic acid (Purebulk.com Lot #20130122-06)

Anhydrides: Maleic anhydride (Sigma-Aldrich CAS #108-31-6), itaconic anhydride (Alfa Aesar CAS #2170-03-8), cis-4-cyclohexene-1,2-dicarboxylic anhydride (Alfa Aesar CAS #935-795), cis-5-norbornene-endo-2,3-dicarboxylic anhydride (Alfa Aesar CAS #129-64-6).

Salts: Guanidine carbonate (Sigma-Aldrich CAS #593-85-1), cesium carbonate (Alfa Aesar CAS #534-17-8), strontium carbonate (Sigma-Aldrich CAS #1633-05-2), rubidium carbonate (Alfa Aesar CAS #584-09-8)

Solvents: Ethanol, Ethylene glycol (Sigma-Aldrich CAS #107-21-1)

Exemplary dielectric preparation procedure: In a 50 mL Erlenmeyer flask, 1 gram of zein and 1.14 grams of itaconic anhydride were dissolved in 10 mL of absolute ethanol by heating to 65° C. with stirring under argon atmosphere for 15 minutes. Once complete dissolution had occurred and reaction temperature reached 65° C., 0.035 grams of dicumyl peroxide was added in one portion, and the mixture continued to stir under argon for 1 hour. The hotplate was then turned off and the mixture was allowed to cool to room temperature. Once cool, the pH of the mixture was tested with universal indicator pH paper (pH -3) and 1 gram of guanidine carbonate was added in small portions until pH measured ~7. Caution was exercised when adding the guanidine carbonate to ensure that excessive effervescence (and bubbling over) was avoided due to the reaction's production of carbon dioxide. More or less guanidine carbonate may be used to achieve neutralization, depending upon the degree of completion of the protein/anhydride reaction, but typically will not greatly exceed 1 molar equivalent of anhydride added. The final pH of the dielectric may be from 5-10.

Notes: a) The protein does contain additional inherent functional groups capable of undergoing reaction with guanidine carbonate, thus the potential need for greater than 1 equivalent; b) the amount of anhydride used was determined based on a 1:1 weight/weight ratio of zein to maleic anhydride (molecular weight 98.06 g/mol). An equimolar equivalent of substituted anhydride (itaconic) was calculated based on the molecular weight for maleic anhydride).

Example 2

Preparation of Polymerized p-Xylylene Coatings

Coatings comprising Puralene™ polymers (polymerized p-xylylene) with and without co-monomers were prepared by several routes.

Materials:

Initiator: Azobisisobutyronitrile (AIBN) (Sigma-Aldrich CAS #78-67-1), 1,1'-azobis(cyclohexanecarbonitrile) (ACHN) (Sigma-Aldrich CAS #2094-98-6), dicumyl peroxide (Sigma-Aldrich CAS #80-43-3), 2-hydroxy-2-methylpropiophenone (Sigma-Aldrich CAS #7473-98-5), camphorquinone (Sigma-Aldrich CAS #10373-78-1), phenanthrenequinone (Sigma-Aldrich CAS #84-11-7)

Initiation source: Heat (>65° C.) from heated evaporator block attached to reactor output, 254 nm light (Philips TUV 15W G15t8 UV-C Long Life), 354 nm light (Sylvania 350 Blacklight F15T8/350BL)

Co-monomer: 3-(trimethoxysilyl)propyl methacrylate (Sigma-Aldrich CAS #2530-85-0), vinyl acetate (Alfa Aesar CAS #108-05-4), 2-carboxyethyl acrylate (Sigma-Aldrich CAS #24615-84-7), (+)-α-pinene (Alfa Aesar CAS #7785-70-8), (−)-α-pinene (Alfa Aesar CAS #7785-26-4), R-(−)-carvone (Alfa Aesar CAS #6485-40-1), linalool (Alfa Aesar CAS #78-70-6), cyclohexene (Alfa Aesar CAS #110-83-8), dipentene (Alfa Aesar CAS #138-86-3), α-terpinene (Alfa Aesar CAS #99-86-5), R-(+)-limonene (Alfa Aesar CAS #5989-27-5)

Puralene™ polymer production using chemical initiator, Route A: This route utilized the reactor described in U.S. Pat. No. 8,633,289 without modifications. To the surface of an oxide free round copper ½" substrate supported by 1½" square FR4 glass filled epoxy board was applied a 5% solution of thermal initiator. This solution was prepared by dissolving 0.05 g of solid initiator (AIBN, ACHN, or dicumyl peroxide) in 10 mL of absolute ethanol and sonicating until complete/nearly complete dissolution had occurred. Once dissolved, 20 µL of the initiator solution was applied to the metal surface and the solvent was allowed to evaporate under ambient atmosphere. This process left behind a thin layer of fine particulate initiator solid on the metal surface. These substrates were then mounted to a chilled aluminum block (~13° C.) attached to a robotic arm. The substrates were then evenly coated with monomeric p-xylylene a minimum of three times and a maximum of ten times. Between coatings, the substrates were allowed to rest on the chilled block for two minutes to enhance the chemical reaction. This produced a conformal coating of polymerized p-xylylene with thicknesses ranging from 300 nm-1000+nm.

Puralene™ polymer production using chemical initiator, Route B: This route utilized the reactor described in U.S. Pat. No. 8,633,289 without modifications. To the surface of the previously described oxide-free copper substrates was applied a 5% solution of UV-active initiator. This solution was prepared by dissolving 0.05 g of solid initiator (camphorquinone, or phenanthrenequinone) in 10 mL of absolute ethanol and sonicating until complete/nearly complete dissolution has occurred. Once dissolved, 20 µL of the initiator solution was applied to the metal surface and the solvent was allowed to evaporate under ambient atmosphere. This process left behind a thin layer of fine particulate initiator solid on the metal surface. These substrates were then mounted to a chilled aluminum block (~13° C.) attached to a robotic arm. The substrates were then evenly coated with p-xylylene a minimum of three times and a maximum of ten times. Between coatings, the substrates were exposed to 254/350 nm UV light, by way of two lamps placed side-by-side in the same housing for two minutes. Following irradiation, the substrates were allowed to rest on the chilled block for an additional two minutes to enhance the chemical reaction. This produced a conformal coating of polymerized p-xylylene with thicknesses ranging from 300 nm-1000+ nm.

Puralene™ polymer production using chemical initiator, Route C: This route utilized the reactor described in U.S. Pat. No. 8,633,289 with the following modifications: To the top of the Inconel reactor tube was attached a heated stainless steel evaporator block into which was fed nitrogen (carrier gas) and 2-hydroxy-2-methylpropiophenone (UV-active initiator, undiluted). The previously described oxide-free copper substrates were then mounted to a chilled aluminum block (~13° C.) attached to a robotic arm. The substrates were then evenly coated with p-xylylene a minimum of three times and a maximum of ten times. Between coatings, the substrates were exposed to 254/350 nm UV light, by way of two lamps placed side-by-side in the same housing for two minutes. Following irradiation, the substrates were allowed to rest on the chilled block for an additional two minutes to enhance the chemical reaction. This produces a conformal coating of polymerized p-xylylene with thicknesses ranging from 300 nm-1000+nm.

Puralene™ copolymer production, Route A: To the surface of the previously described oxide-free copper electrodes was applied 5 µL of the 5% initiator solutions (detailed above) or 5 µL of neat 2-hydroxy-2-methylpropiophenone and 20 µL of one of the co-monomers listed above. The substrates were allowed to dry slightly so that the liquid materials would not drip off the surface when the substrates were mounted vertically. The prepared substrates were then coated using the methods described in the above Puralene™ polymer production routes A-C (initiator dependent). This produced copolymer films of varying thicknesses capable of being analyzed using energy-dispersive X-ray spectroscopy.

Puralene™ copolymer production, Route B: To the surface of the previously described oxide-free copper electrodes was applied 20 µL of the 5% initiator solutions (detailed above) or 20 µL of neat 2-hydroxy-2-methylpropiophenone. Once the carrier solvent had evaporated and the substrates were mounted, an airbrush was used to apply liquid co-monomer to the substrate surface prior to coating. Then, the coating technique described in Puralene™ polymer production using chemical initiator, Route A was employed.

Puralene™ copolymer production, Route C: This route utilized the reactor described in U.S. Pat. No. 8,633,289 with the following modifications: To the top of the Inconel reactor tube was attached a heated stainless steel evaporator block into which was fed nitrogen (carrier gas) and liquid co-monomer (undiluted). To the surface of the previously described oxide-free copper electrodes was applied 20 µL of the 5% initiator solutions (detailed above) or 20 µL of neat 2-hydroxy-2-methylpropiophenone. Once the carrier solvent had evaporated, the substrates were mounted on the chilled block. In this process, the co-monomer was vaporized in the evaporator block, heated to a monomer specific boiling point temperature, and the vaporized monomer was added to the main p-xylylene flow so that both monomer and xylylene were applied to the substrate surface simultaneously. The prepared substrates were then coated using the methods described in the above Puralene™ polymer production routes A-C (initiator dependent).

Puralene™ copolymer production, Route D: This route utilized the reactor described in U.S. Pat. No. 8,633,289 with the following modifications: To the top of the Inconel reactor tube was attached a heated stainless steel evaporator block into which was fed nitrogen (carrier gas) and liquid co-monomer (undiluted). A second evaporator block was positioned above that to deliver nitrogen and liquid initiator (2-hydroxy-2-methylpropiophenone). In this process, both the co-monomer and initiator were vaporized and entered the p-xylylene flow so that all three materials contacted the substrates simultaneously. Oxide-free copper substrates were mounted on the chilled block and coated using the methods described in the above Puralene™ polymer production using chemical initiator, Route C.

Example 3

Preparation of an Energy Storage Device

A sheet or roll of metalized polymer, e.g., patterned aluminized polyethylene terephthalate (PET) (Mylar® polyester film) is coated with an insulative layer, such as a coating comprising the Puralene™ polymer as described in US 2014/0139974 A1. In some examples, the sheet or roll of metalized polymer has a thickness of approximately 6 µm and a width of approximately 50 mm. The nonconductive coating is applied to the metalized surface and is not allowed to fully cover the surface. An approximate 6 mm bare conductive surface is left exposed on one edge. The coated metalized material is then coated with a spray of dielectric material described in US 2013/0224397 A1 on top of the nonconductive polymer surface. Sufficient dielectric material is deposited to provide a dielectric layer having a thickness of approximately 100 µm after drying for 10 minutes at 60° C. Another sheet or roll of metalized polymer that has been coated with a nonconductive polymer in a similar manner as the first substrate is then reversed such that the uncoated edge is opposite the uncoated edge of the first substrate and the two aluminized surfaces face each other. The polymer-coated side of the second substrate is brought into contact with the dielectric-coated side of the first substrate. The composite multilayered surface is then wound into a roll (which may subsequently be flattened) or stacked as plates to provide for larger devices with larger amounts of energy storage. Electrical connection to the uncoated electrode edges of the roll or stack is provided by bonding the conductive electrode edges to a conductive polymer blend (such as a conductive epoxy known to those skilled in the art). The conductive polymer is contained within a mechanically substantive conductive cap or other nonconductive holder that has an electrical connection such as a wire, and/or mechanical strength enough to allow compressive electrical connections. An optional sleeve can be placed around the entire device to provide mechanical and electrical protection to the thin films and the device itself when in its intended use.

The energy storage device is attached to a DC voltage supply. The device is powered with a current of 0.001 to 100 mA/cm². At an electric field strength greater than 0.001 V per micron thickness of the dielectric film, a current is allowed to flow for an effective period of time to bind at least some polymeric molecules of the dielectric film to the nonconductive coating. In some embodiments, the electric field strength is greater than 0.01 V/µm, such as from 0.05-1 V/µm or 0.1-1 V/µm. The effective period of time may be from several seconds to several minutes. In some embodiments, the voltage is 0.1-1 V/µm and the effective period of time is from 5 minutes to 30 minutes. A calculation of the energy absorbed by the device is determined by methods known to those skilled in the art of making energy storage devices. Discharge of the absorbed energy is determined by integration of the differential voltage of discharge through a resistor to ground.

In a working example, disassembly of the device and microscopic inspection revealed that the dielectric material is strongly and mechanically bonded to the nonconductive polymer-coated electrode surfaces.

Example 4

Preparation of a Copolymer Layer with Radical Initiators and Crosslinking Agent

In an energy storage device as shown in any one of FIGS. 1-6, a monomeric molecule (preferably a p-xylylene monomer) is deposited on a conductive electrode or a nonconductive sheet (e.g., a polytetrafluoroethylene sheet) that is to serve as a removable carrier film. The co-monomeric molecules may be any molecules that may have the ability to polymerize, dimerize or form extended structures that may be conductive or insulative. Additionally, the co-monomeric species added might have a structure with several reactive functionalities that may serve as cross-linking agents. Alternatively, a crosslinking agent as described above, or known to those skilled in the art of polymerizations or film formation, may be added with the deposited monomers. A radical initiator as described above, or known to those skilled in the art of polymerizations or film formation, is added with the deposited monomers or in a separate deposition step. The film may be deposited by vapor phase deposition, by liquid spraying, by screening, or by other methods known to those skilled in the art of film formation. Activation of the radical initiator is provided by means of oxidation-reduction, photoinitiation, thermal initiation, or other methods known to those skilled in the art of film formation. Exemplary methods for making a polymer film are described in U.S. Pat. No. 8,633,289, which is incorporated herein by reference. An electric field, a magnetic field, or both may be applied to the polymer film during formation to modify the mechanical and electrical properties of the film, e.g., to make the film more viscous or solid.

A dielectric layer may then be deposited as a separate step if the film formed above is not the complete dielectric material for the device. The opposite electrode is then added as described in the previous examples, and the device mounted as described previously.

Example 5

Polymer Binding

An insulative layer of Puralene™ polymer was applied to a first electrode surface using the method described in "Puralene™ polymer producing using chemical initiator, Route C." A dielectric film comprising zein was applied on the insulative layer. A second electrode comprising an insulative layer of Puralene™ polymer was brought into contact with the dielectric film. An electrical field of 20 V was applied across the first electrode, dielectric film, and second electrode for 5 minutes to bind zein polymers to the insulative layer on the first (positive) electrode. The energy storage device was disassembled and examined to determine the extent and strength of the protein binding.

FIGS. 7 and 8 are optical microscopy photographs of the negative and positive electrodes, respectively, after disassembly. As seen in FIG. 8, the positive electrode includes a conformal coating of protein on its surface. The electrodes were rinsed with running water and examined again. FIGS. 9 and 10 are optical photographs of the negative and positive electrodes, respectively, after rinsing. As can be seen in FIG. 10, the protein remained bound to the positive electrode's surface.

Figure 11:
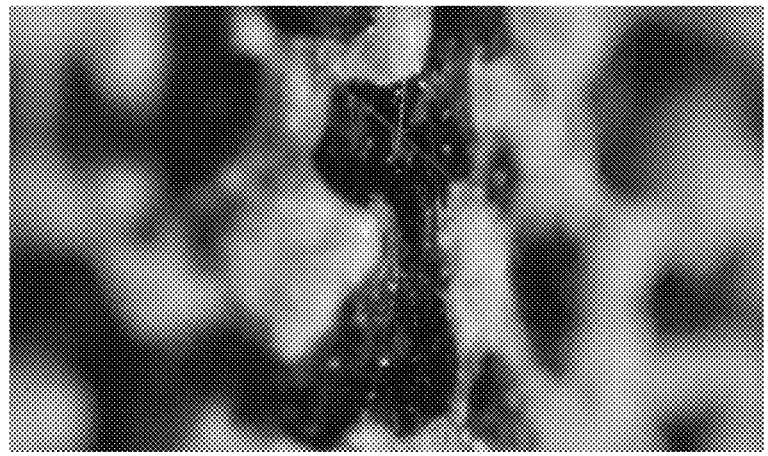
FIG. 11 is an optical photograph, taken at an angle, of the negative electrode of FIG. 9.
Figure 12:
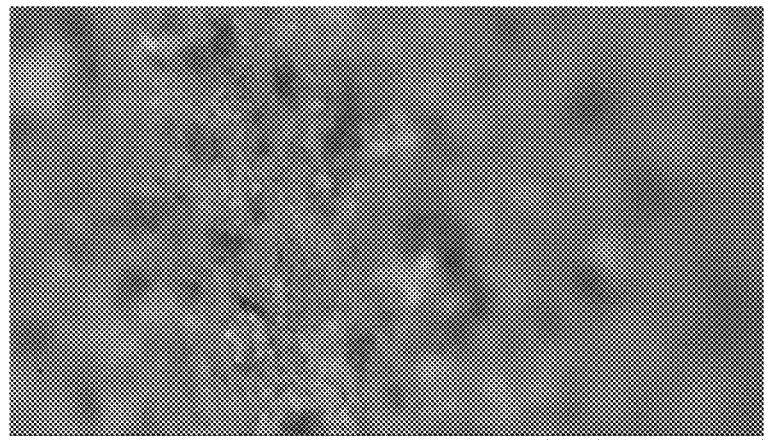
FIG. 12 is an optical photograph, taken at an angle, of the positive electrode of FIG. 10.
Figure 13:
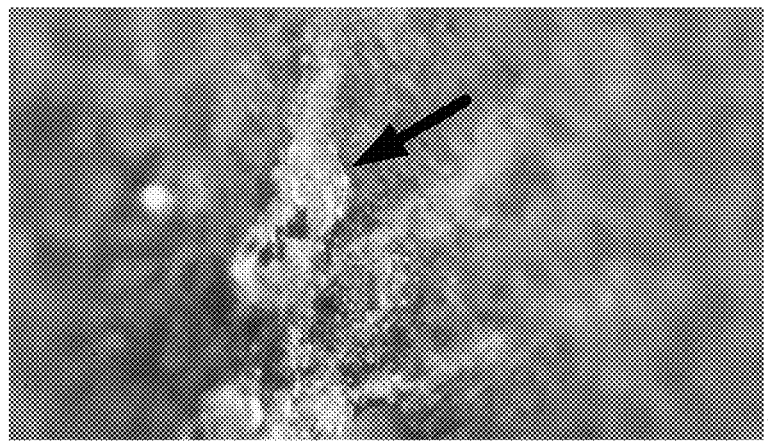
FIG. 13 is an optical photograph of the positive electrode of FIG. 10 after manual scraping to remove bound polymeric molecules.

FIGS. 11 and 12 are optical photographs of the negative and positive electrodes, respectively. These photographs were taken at an angle to more clearly show surface detail. FIG. 12 shows substantially complete coverage of the electrode surface with protein molecules. FIG. 13 is an optical photograph of the rinsed positive electrode after manually scraping the dielectric film with a knife. The lighter areas (indicated with arrow) are areas that were scraped to remove the bound protein molecules and show the electrode surface below the protein layer. The photograph shows that considerable force is required to remove the bound protein molecules from the electrode surface.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An energy storage device, comprising: an electrically conductive first electrode; an electrically conductive second electrode;
   a sterically constrained dielectric film disposed between the electrically conductive first and second electrodes, the sterically constrained dielectric film comprising a plurality of polymeric molecules having one or more polar functional groups, ionizable functional groups, or a combination thereof, the energy storage device having an energy storage capacity, in the absence of the energy storage device having been charged and/or discharged, of at least 1 Wh/kg based solely on the weight of the sterically constrained dielectric film disposed between the electrically conductive first and second electrodes; and
   a first insulative layer disposed between the electrically conductive first electrode and the dielectric film and a second insulative layer disposed between the electrically conductive second electrode and the sterically constrained dielectric film, wherein each of the first insulative layer and the second insulative layer consists of a polymerized p-xylylene insulative layer or a copolymer insulative layer prepared from p-xylene and one or more co-monomers selected from acrylates, methacrylates, a-pinene, R-(−)carvone, linalool, cyclohexene, dipentene, a-terpinene, R-(+)-limonene, or any combination thereof,
   wherein the electrically conductive first electrode and the first insulative layer collectively form a composite first electrode,
   the electrically conductive second electrode and the second insulative layer collectively form a composite second electrode, and
   at least 1% of the plurality of polymeric molecules are bound to the first insulative layer of the composite first electrode, thereby sterically constraining the dielectric film.

2. The energy storage device of claim 1, wherein the polymeric molecules are protein molecules.

3. The energy storage device of claim 1, wherein the energy storage device has an energy storage capacity at least 100× greater than an energy storage capacity of a comparable energy storage device comprising a dielectric film having substantially the same chemical composition as the dielectric film of the energy storage device, but wherein the polymeric molecules are not bound to the composite first electrode.

4. The energy storage device of claim 1, wherein the sterically constrained dielectric film has a permittivity from 50% to 10,000,000% greater than a permittivity of a dielectric film comprising the plurality of polymeric molecules having one or more polar functional groups, ionizable functional groups, or a combination thereof, wherein the polymeric molecules are not bound to the composite first electrode.

5. The energy storage device of claim 1, wherein polymeric molecules are bound to at least 1% of a surface of the first insulative layer in contact with the dielectric film.

6. The energy storage device of claim 1, wherein the first insulative layer and the second insulative layer independently have an average thickness of from 5 nm to 10 µm.

7. The energy storage device of claim 6, wherein the first insulative layer and the second insulative layer are polymerized p-xylylene insulative layers.

8. The energy storage device of claim 1, wherein at least 25% of the plurality of polymeric molecules are bound to the first insulative layer.

9. A method for making an energy storage device according to claim 1, the method comprising: making an energy storage device by
applying a first insulative layer to an electrically conductive first electrode to form a composite first electrode, wherein the first insulative layer consists of a polymerized p-xylylene insulative layer or a copolymer insulative layer prepared from p-xylene and one or more comonomers selected from acrylates, methacrylates, a-pinene, R-(−)carvone, linalool, cyclohexene, dipentene, a-terpinene, R-(+)-limonene, or any combination thereof;
applying a dielectric film to the first insulative layer of the composite first electrode, the dielectric film comprising a material that (i) is electrically insulative and/or exhibits a high permittivity and (ii) comprises a plurality of polymeric molecules having one or more polar functional groups, ionizable functional groups, or a combination thereof;
contacting the dielectric film with a composite second electrode comprising a second insulative layer and positioned such that the second insulative layer of the composite second electrode contacts the dielectric film, wherein the second insulative layer consists of a polymerized p-xylylene insulative layer or a copolymer insulative layer prepared from p-xylene and one or more co-monomers selected from acrylates, methacrylates a-pinene, R-(−)carvone, linalool, cyclohexene, dipentene, a-terpinene, R-(+)-limonene, or any combination thereof; and
binding at least 1% of the plurality of polymeric molecules to the composite first electrode to form a sterically constrained dielectric film by
(i) applying an electric field across the composite first electrode, the dielectric film, and the composite second electrode such that the composite first electrode is a positive electrode, the electric field being applied for an effective period of time to bind at least 1% of the plurality of polymeric molecules to the first insulative layer of the composite first electrode,
(ii) treating the dielectric film with a chemical agent, or
(iii) a combination thereof, thereby making the energy storage device.

10. The method of claim 9, wherein the electric field is at least 0.001 V/µm based on an average thickness of the dielectric film.

11. The method of claim 10, wherein the electric field is 0.005-1 V/µm and the effective period of time is from 1 second to 30 minutes.

12. The method of claim 9, wherein the first insulative layer is a polymerized p-xylylene insulative layer.

13. The method of claim 9, wherein treating the dielectric film with a chemical agent comprises:
applying a radical initiator to the first insulative layer before applying the dielectric film to the first insulative layer; and
activating the radical initiator after applying the dielectric film to the first insulative layer, thereby binding at least some of the polymeric molecules to the first insulative layer of the composite first electrode.

14. The method of claim 9, wherein treating the dielectric film with a chemical agent comprises:
(i) derivatizing the polymeric molecules with a derivatization agent to provide functional groups capable of cross-linking to the first insulative layer of the composite first electrode;
(ii) including a crosslinking agent in the film material of the dielectric film;
(iii) including a radical initiator in the film material of the dielectric film, and activating the radical initiator after applying the dielectric film to the first insulative layer;
(iv) applying a radical initiator to the first insulative layer before applying the dielectric film to the first insulative layer, and activating the radical initiator after applying the dielectric film to the first insulative layer;
(v) applying a plasma to the first insulative layer before applying the dielectric film to the first insulative layer; or
(vi) any combination thereof.

15. The method of claim 9, wherein the polymeric molecules comprise proteins, parylene, acrylic acid polymers, methacrylic acid polymers, polyethylene glycol, urethane polymers, epoxy polymers, silicone polymers, terpenoid polymers, naturally occurring resin polymers, polyisocyanates, or combinations thereof.

16. The method of claim 9, wherein the polymeric molecules comprise proteins or derivatized proteins.

17. The method of claim 9, wherein applying the dielectric film to the composite first electrode comprises:
forming the dielectric film on a removable carrier film;
removing the removable carrier film; and
applying the dielectric film to the first insulative layer of the composite first electrode.

18. The method of claim 9, wherein the polymeric molecules are formed in situ, the method further comprising:
applying a composition comprising a crosslinking agent and a plurality of polymeric molecule precursors comprising one or more polar functional groups, ionizable functional groups, or a combination thereof to the first electrode; and
activating the crosslinking agent, thereby crosslinking the polymeric molecule precursors to provide a dielectric film comprising a plurality of polymeric molecules.

19. The method of claim 18, wherein the polymeric molecule precursors comprise (i) amino acid molecules, (ii) oligopeptides, (iii) polypeptides, or (iv) a combination thereof.

20. The method of claim 18, wherein the polymeric molecule precursors further comprise p-xylylene monomers.

* * * * *